United States Patent [19]
Wilkinson et al.

[11] Patent Number: 5,809,292
[45] Date of Patent: Sep. 15, 1998

[54] FLOATING POINT FOR SIMID ARRAY MACHINE

[75] Inventors: Paul Amba Wilkinson, Apalachin; James Warren Dieffenderfer, Owego; Peter Michael Kogge, Endicott, all of N.Y.

[73] Assignee: International Business Machines Corporation, Armonk, N.Y.

[21] Appl. No.: 460,515

[22] Filed: Jun. 1, 1995

Related U.S. Application Data

[63] Continuation of Ser. No. 887,514, May 22, 1992, and a continuation-in-part of Ser. No. 611,594, Nov. 13, 1990, abandoned, and Ser. No. 798,788, Nov. 27, 1991, abandoned.

[51] Int. Cl.⁶ .................................................... G06F 15/16
[52] U.S. Cl. ............. 395/563; 395/800.14; 395/800.22; 395/898; 364/745.01; 364/748.02; 364/748.19
[58] Field of Search .............................. 395/800, 800.22, 395/800.14, 563, 898; 364/DIG. 1, DIG. 2, 741, 745, 748, 752, 753, 745.01, 748.02, 748.19

[56] References Cited

U.S. PATENT DOCUMENTS

| | | | |
|---|---|---|---|
| 3,537,074 | 10/1970 | Stokes et al. | 340/172 |
| 3,544,973 | 12/1970 | Borck et al. | 340/172.5 |
| 3,970,993 | 7/1976 | Finnila | 340/172.5 |

(List continued on next page.)

FOREIGN PATENT DOCUMENTS

| | | |
|---|---|---|
| 0132926 | 2/1985 | European Pat. Off. . |
| 0208497 | 6/1986 | European Pat. Off. . |
| 208457A2 | 6/1986 | European Pat. Off. . |
| 340668A2 | 4/1989 | European Pat. Off. . |
| 428327A1 | 11/1990 | European Pat. Off. . |
| 429733A2 | 6/1991 | European Pat. Off. . |

(List continued on next page.)

OTHER PUBLICATIONS

T.A. Kriz and M.J. Marple, "Multi–Port Bus Structure With Fast Shared Memory", IBM Technical Disclosure Bulletin, vol. 27, No. 10A, pp. 5579–5580, Mar. 1985.

(List continued on next page.)

*Primary Examiner*—Alyssa H. Bowler
*Assistant Examiner*—John Follausbee
*Attorney, Agent, or Firm*—Lynn Augspurger; Morgan & Finnegan, L.L.P.

[57] ABSTRACT

A floating point system and method according to a format that includes a sign bit, an exponent part having a plurality of bits, and a fraction part having a plurality of multi-bit blocks, wherein floating point operation is based on block shifts of the fraction part, with each shift of one block associated with an increment or decrement of the exponent part by one count. This format illustrated is implemented as a format suitable for the accuracy greater than the IEEE 32-bit floating-point format, and is intended to be implemented in machines having byte-wide (8 bit) data streams. The preferred format consists of a sign bit, 7 exponent bits and 4 fraction bytes of eight bits for a total of 40 bits. This format and implementation allows floating-point commands to be executed in a fixed small number of cycles, thus advancing the capabilities of doing floating-point arithmetic on a SIMD machine. The floating-point implementation is adaptable to multiprocessor parallel array processor computing systems and for parallel array processing with a simplified architecture adaptable to chip implementation. The array provided is an N dimensional array of byte-wide processing units each coupled with an adequate segment of byte-wide memory and control logic. A partitionable section of the array containing several processing units is contained on a silicon chip arranged with eight elements of the processing array each preferably consisting of combined processing element with a local memory for processing bit parallel bytes of information in a clock cycle. A processor system (or subsystem) comprises an array of pickets, a communication network, an 1/0 system, and a SIMD controller consisting of a microprocessor, a canned-routine processor, and a microcontroller that runs the array.

22 Claims, 6 Drawing Sheets

U.S. PATENT DOCUMENTS

| | | | |
|---|---|---|---|
| 4,101,960 | 7/1978 | Stokes et al. | 364/200 |
| 4,107,773 | 8/1978 | Gilbreath et al. | 364/200 |
| 4,270,170 | 5/1981 | Reddaway | 364/200 |
| 4,314,349 | 2/1982 | Batcher | 364/716 |
| 4,338,675 | 7/1982 | Palmer et al. | 364/748 |
| 4,380,046 | 4/1983 | Fung | 364/200 |
| 4,394,726 | 7/1983 | Kohl | 364/200 |
| 4,412,303 | 10/1983 | Barnes et al. | 364/900 |
| 4,435,758 | 3/1984 | Lorie et al. | 364/200 |
| 4,467,422 | 8/1984 | Hunt | 364/200 |
| 4,468,727 | 8/1984 | Carrison | 364/200 |
| 4,498,133 | 2/1985 | Bolton et al. | 364/200 |
| 4,523,273 | 6/1985 | Adams, III et al. | 364/200 |
| 4,598,400 | 7/1986 | Hillis | 370/60 |
| 4,604,695 | 8/1986 | Widen et al. | 364/200 |
| 4,621,339 | 11/1986 | Wagner et al. | 364/200 |
| 4,622,650 | 11/1986 | Kulisch | 364/748 |
| 4,706,191 | 11/1987 | Hamstra et al. | 364/200 |
| 4,720,780 | 1/1988 | Dolecek | 364/200 |
| 4,734,878 | 3/1988 | Sutcliffe | 364/752 |
| 4,736,291 | 4/1988 | Jennings et al. | 364/200 |
| 4,739,474 | 4/1988 | Holsztynski | 364/200 |
| 4,739,476 | 4/1988 | Fiduccia | 364/200 |
| 4,748,585 | 5/1988 | Chiarulli | 364/900 |
| 4,763,321 | 8/1988 | Calvignac et al. | 370/94 |
| 4,780,873 | 10/1988 | Mattheyses | 370/94 |
| 4,783,738 | 11/1988 | Li et al. | 364/200 |
| 4,783,782 | 11/1988 | Morton | 371/11 |
| 4,805,091 | 2/1989 | Thiel et al. | 364/200 |
| 4,809,159 | 2/1989 | Sowa | 364/200 |
| 4,809,169 | 2/1989 | Sfarti et al. | 364/200 |
| 4,809,347 | 2/1989 | Nash et al. | 382/49 |
| 4,814,980 | 3/1989 | Peterson et al. | 364/200 |
| 4,825,359 | 4/1989 | Ohkami et al. | 364/200 |
| 4,831,519 | 5/1989 | Morton | 364/200 |
| 4,835,729 | 5/1989 | Morton | 364/200 |
| 4,841,467 | 6/1989 | Ho et al. | 364/748.07 |
| 4,841,476 | 6/1989 | Mitchell et al. | 364/900 |
| 4,847,755 | 7/1989 | Morrison et al. | 364/200 |
| 4,849,882 | 7/1989 | Aoyama et al. | 364/200 |
| 4,852,048 | 7/1989 | Morton | 364/200 |
| 4,855,903 | 8/1989 | Carleton et al. | 364/200 |
| 4,858,110 | 8/1989 | Miyata | 364/200 |
| 4,860,201 | 8/1989 | Stolfo et al. | 364/200 |
| 4,872,133 | 10/1989 | Leeland | 364/748 |
| 4,873,626 | 10/1989 | Gifford | 364/200 |
| 4,891,787 | 1/1990 | Gifford | 364/900 |
| 4,896,265 | 1/1990 | Fiduccia et al. | 364/200 |
| 4,901,224 | 2/1990 | Ewert | 364/200 |
| 4,903,260 | 2/1990 | Boettle et al. | 370/60 |
| 4,905,143 | 2/1990 | Takahashi et al. | 364/200 |
| 4,907,148 | 3/1990 | Morton | 364/200 |
| 4,910,665 | 3/1990 | Mattheyses et al. | 364/200 |
| 4,916,652 | 4/1990 | Schwarz | 364/748 |
| 4,916,657 | 4/1990 | Morton | 364/900 |
| 4,920,484 | 4/1990 | Ranade | 364/200 |
| 4,922,408 | 5/1990 | Davis et al. | 364/200 |
| 4,925,311 | 5/1990 | Neches et al. | 364/200 |
| 4,933,846 | 6/1990 | Humphrey et al. | 364/200 |
| 4,933,895 | 6/1990 | Grinberg et al. | 364/748 |
| 4,942,516 | 7/1990 | Hyatt | 364/200 |
| 4,942,517 | 7/1990 | Cok | 364/200 |
| 4,943,912 | 7/1990 | Aoyma et al. | 364/200 |
| 4,956,772 | 9/1990 | Neches | 364/200 |
| 4,958,273 | 9/1990 | Anderson et al. | 364/200 |
| 4,964,032 | 10/1990 | Smith | 364/200 |
| 4,967,340 | 10/1990 | Dawes | 364/200 |
| 4,975,834 | 12/1990 | Xu et al. | 364/200 |
| 4,977,535 | 12/1990 | Birger et al. | 364/748.03 |
| 4,985,832 | 1/1991 | Grondalski | 364/200 |
| 4,992,926 | 2/1991 | Janke et al. | 364/134 |
| 4,992,933 | 2/1991 | Taylor | 364/200 |
| 4,994,996 | 2/1991 | Fossum et al. | 364/748 |
| 5,005,120 | 4/1991 | Ruetz | 364/200 |
| 5,006,978 | 4/1991 | Neches | 364/200 |
| 5,008,815 | 4/1991 | Hillis | 364/200 |
| 5,008,882 | 4/1991 | Peterson et al. | 370/94.3 |
| 5,010,477 | 4/1991 | Omoda et al. | 364/200 |
| 5,016,163 | 5/1991 | Jesshope et al. | 364/200 |
| 5,020,059 | 5/1991 | Gorin et al. | 371/11.3 |
| 5,021,945 | 6/1991 | Morrison et al. | 364/200 |
| 5,027,308 | 6/1991 | Sit et al. | 364/748 |
| 5,038,282 | 8/1991 | Gilbert et al. | 364/200 |
| 5,038,386 | 8/1991 | Li | 382/49 |
| 5,041,189 | 8/1991 | Tamitani | 364/200 |
| 5,041,971 | 8/1991 | Carvey et al. | 364/200 |
| 5,045,995 | 9/1991 | Levinthal et al. | 364/200 |
| 5,047,917 | 9/1991 | Athas et al. | 364/200 |
| 5,049,982 | 9/1991 | Lee et al. | 357/81 |
| 5,056,000 | 10/1991 | Chang | 364/200 |
| 5,072,217 | 12/1991 | Georgiou et al. | 340/825.79 |
| 5,113,523 | 5/1992 | Colley et al. | 395/800 |
| 5,121,498 | 6/1992 | Gilbert et al. | 395/700 |
| 5,136,582 | 8/1992 | Firoozmand | 370/85.1 |
| 5,142,540 | 8/1992 | Glasser | 371/40.1 |
| 5,146,608 | 9/1992 | Hillis | 395/800 |
| 5,165,023 | 11/1992 | Gifford | 395/325 |
| 5,170,482 | 12/1992 | Shu et al. | 395/800 |
| 5,170,484 | 12/1992 | Gorodalski | 395/800 |
| 5,173,947 | 12/1992 | Chande et al. | 382/41 |
| 5,175,862 | 12/1992 | Phelps et al. | 395/800 |
| 5,175,865 | 12/1992 | Hillis | 395/800 |
| 5,181,017 | 1/1993 | Frey, Jr. et al. | 340/825.02 |
| 5,187,801 | 2/1993 | Zenios et al. | 395/800 |
| 5,189,665 | 2/1993 | Niehaus et al. | 370/458.1 |
| 5,197,130 | 3/1993 | Chen et al. | 395/325 |
| 5,212,773 | 5/1993 | Hillis | 395/200 |
| 5,212,777 | 5/1993 | Gove et al. | 395/375 |
| 5,218,676 | 6/1993 | Ben-Ayed et al. | 395/200 |
| 5,218,709 | 6/1993 | Fijany et al. | 395/800 |
| 5,230,079 | 7/1993 | Grondalski | 395/800 |
| 5,239,629 | 8/1993 | Miller et al. | 395/325 |
| 5,239,654 | 8/1993 | Ing-Simmons et al. | 395/800 |
| 5,251,097 | 10/1993 | Simmons et al. | 361/687 |
| 5,253,359 | 10/1993 | Spix et al. | 395/575 |
| 5,265,124 | 11/1993 | Staab et al. | 375/3 |
| 5,280,474 | 1/1994 | Nickolls et al. | 370/60 |
| 5,297,260 | 3/1994 | Kametani | 395/325 |
| 5,355,508 | 10/1994 | Kan | 395/800 |
| 5,367,636 | 11/1994 | Colley et al. | 395/200 |

FOREIGN PATENT DOCUMENTS

| | | |
|---|---|---|
| 460599A3 | 12/1991 | European Pat. Off. . |
| 485690A2 | 5/1992 | European Pat. Off. . |
| 493876A2 | 7/1992 | European Pat. Off. . |
| 2223867 | 4/1990 | United Kingdom . |
| 89/09967 | 4/1988 | WIPO . |
| 92/06436 | 4/1992 | WIPO . |

OTHER PUBLICATIONS

H.P. Bakoglu, "Second–Level Shared Cache Implementation For Multiprocessor Computers With A Common Interface For The Second–Level Shared Cache And The Second–Level Private Cache", IBM Technical Disclosure Bulletin, vol. 33, No. 11, pp. 362–365, Apr. 1991.

Mansingh et al., "System Level Air Flow Analysis for a Computer System Processing Unit", *Hewlett–Packard Journal*, vol. 41 No. 5, Oct. 1990, pp. 82–87.

Tewksbury et al., "Communication Network Issues and High–Density Interconnects in Large–Scale Distributed Computing Systems", *IEEE Journal on Selected Areas in Communication,* vol. 6 No. 3, Apr. 1988, pp. 587–607.

Boubekeur et al., "Configuring A Wafer–Scale Two–Dimensional Array of Single–Bit Processors", Computer, vol. 2, Issue 4, Apr. 1992, pp. 29–39.

Korpiharju et al., "TUTCA Configurable Logic Cell Array Architecture" IEEE, Sep. 1991, pp. 3–3.1—3–3.4.

C.K. Baru and S.Y.W. Su, "The Architecture of SM3: A Dynamically Partitionable Multicomputer System", IEEE Transactions on Computers, vol. C–35, No. 9, pp. 790–802, Sep. 1986.

S.P. Booth et al., "An Evaluation of the Meiko Computing Surface for HEP Fortran Farming*", Computer Physics Communications 57, pp. 486–491, 1989.

S.P. Booth et al., "Large Scale Applications of Transputers in HEP: The Edinburgh Concurrent Supercomputer Project", Computer Physics Communications 57, pp. 101–107, 1989.

P. Christy, "Software to Support Massively Parallel Computing on the MasPar MP–1", 1990 IEEE, pp. 29–33.

S.R. Colley, "Parallel Solutions to Parallel Problems", Research & Development, pp. 42–45, Nov. 21, 1989.

J.R. Nickolls, "The Design of the MasPar MP–1: A Cost Effective Massively Parallel Computer", 1990 IEEE, pp. 25–28.

J.F. Prins and J.A. Smith, "Parallel Sorting of Large Arrays on the MasPar MP–1*, The 3rd Symposium on the Frontiers of Massively Parallel Computation", pp. 59–64, Oct., 1990.

J.B. Rosenberg and J.D. Becher, "Mapping Massive SIMD Parallelism onto Vector Architectures for Simulation", Software–Practice and Experience, vol. 19(8), pp. 739–756, Aug. 1989.

J.C. Tilton, "Porting an Interative Parallel Region Growing Algorithm from the MPP to the MasPar MP–1", The 3rd Symposium on the Frontiers of Massively Parallel Computation, pp. 170–173, Oct., 1990.

"Sequent Computer Systems Balance and Symmetry Series", Faulkner Technical Reports, Inc., pp. 1–6, Jan., 1988.

"Symmetry 2000/4000 and 2000/7000 with the DYNIX/ptx Operation System", Sequent Computer Systems Inc.

"Symmetry 2000 Systems –Foundation for Information Advantage", Sequent Computer Systems Inc.

"Our Customers Have Something That Gives Them an Unfair Advantage", The nCUBE Parallel Software Environment, nCUBE Corporation.

Y.M. Leung, "Parallel Technology Mapping With Identification of Cells for Dynamic Cell Generation", Dissertation, Syracuse University, May 1992.

"The Connection Machine CM–5 Technical Summary", Thinking Machines Corporation, Oct., 1991.

Fineberg et al., "Experimental Analysis of a Mixed–Mode Parallel Architecture Using Bitonic Sequence Sorting", *Journal of Parallel And Distributed Computing,* Mar. 1991, pp. 239–251.

T. Bridges, "The GPA Machine: A Generally Partionable MSIMD Architecture", The 3rd Symposium on the Frontiers of Massively Parallel Computation, Oct. 1990, pp. 196–203.

Abreu et al., "The APx Accelerator", The 2nd Symposium on the Frontiers of Massively Parallel Computation, Oct. 1988, pp. 413–417.

D.A. Nicole, "Esprit Project 1085 Reconfigurable Transputer Processor Architecture", CONPAR 88 Additional Papers, Sep. 1988, pp. 12–39.

E. DeBenedictis and J.M. del Rosario, "nCUBE Parallel I/O Software", IPCCC '92, 1992 IEEE, pp. 0117–0124.

T.H. Dunigan, Hypercube Clock Synchronization:. Concurrency: Practice and Experience, vol. 4(3), pp. 257–268, May 1992.

T.H. Dunigan, "Performance of the Intel iPSC/860 and Ncube 6400 hypercubes*", Parallel Computing 17, pp. 1285–1302, 1991.

D.D. Gajski and J.K. Peir, "Essential Issues in Multiprocessor Systems", 1985 IEEE, pp. 9–27, Jun. 1985.

A. Holman, "The Meiko Computing Surface: A Parallel & Scalable Open Systems Platform for Oracle", A Study of a Parallel Database Machine and its Performance –The NCR/Teradata DBC/1012, pp. 96–114.

Baba et al., "A Parallel Object–Oriented Total Architecture: A–Net", Proceedings Supercomputing, Nov. 1990, pp. 276–285.

Mitchell et al., "Architectural Description of a New, Easily Expandable Self–Routing Computer Network Topology", IEEE INFOCOM, Apr. 1989, pp. 981–988.

K. Padmanabhan, "Hierarchical Communication in Cube–Connected Multiprocessors", The 10th International Conference on Distributed Computing Systems, May 1990, pp. 270–277.

Fineberg et al., "Experimental Analysis of Communication/Data–Conditional Aspects of a Mixed–Mode Parallel Architecture via Synthetic Computations", *Proceeding Supercomputing '90,* Nov. 1990, pp. 647–646.

Kan et al., "Parallel Processing on the CAP: Cellular Array Processor", *COMPCOM* 84, 16 Sep. 1984, pp. 239–244.

Ezzedine et al., "A 16–bit Specialized Processor Design", *Integration The VLSI Journal,* vol. 6 No. 1, May 1988, pp. 101–110.

A. Mudrow, "High Speed Scientific Arithemetic Using a High Performance Sequencer", *Electro,* vol. 6, No. 11, 1986, pp. 1–5.

Alleyne et al., "A Bit–Parallel, Word–Parallel, Massively Parallel Accociative Processor for Scientific Computing", *Third Symposium on the Frontiers of Massive Parallel Computation,* Oct. 8–10, 1990; pp. 176–185.

Jesshoppe et al., "Design of SIMD Microprocessor Array", *IEEE Proceedings,* vol. 136., May 1989, pp. 197–204.

DeGroot et al., "Image Processing Using the Sprint Multiprocesson", *IEEE,* 1989, pp. 173–176.

Nudd et al., "An Heterogeneous M–SIMD Architecture for Kalman Filter Controlled Processing of Image Sequences", *IEEE* 1992, pp. 842–845.

Li et al., "Polmorphic–Torus Network", IEEE Transactions on Computers, vol. 38, No. 9, Sept. 1989 pp. 1345–1351.

Li et al., "Sprase Matrix Vector Multiplication of Polymorphic–Torus", IBM Technical Disclosure Bulletin, vol. 32, No. 3A, Aug. 1989, pp. 233–238.

Li et al., "Parallel Local Operator Engine and Fast P300", IBM Tech. Disc. Bulletin, vol. 32, No. 8B, Jan. 1990, pp. 295–300.

R. Duncan, "A Survey Of Parallel Computer Architectures", IEEE, Feb. 90' pp. 5–16.

C.R. Jesshope et al., "Design of SIMD Microprocessor Array", UMI Article Clearing house, Nov. 88'.

Sener Ilgen & Issac Schers, "Parallel Processing on VLSI Associative Memory", NSF Award ™ECS–8404627, pp. 50–53.

H. Stone, "Introduction To Computer Architecture", Science Research Associates, 1975, Ch. 8, pp. 318–374.

R. M. Lea, "WASP: A WSI Associative String Processor" Journal of VLSI Signal Processing, May 1991, No. 4, pp. 271–285.

Lea, R.M., "ASP Modules: Cost–Effective Building–Blocks for Real–Time DSP Systems", Journal of VLSI Signal Processing, vol. 1, No. 1, Aug. 1989, pp. 69–84.

Issac D. Scherson, et al., "Bit Parallel Arithmetic in a Massively–Parallel Associative Processor", IEEE, vo. 41, No. 10, Oct. 1992.

Supreet Singh and Jia–Yuan Han, "Systolic arrays", IEEE, Feb. 1991.

H. Richter and G. Raupp, "Control of a Tokamak Fusion Esperiment by a Set of MULTITOP Parallel Computers", IEEE vol. 39, 1992, pp. 192–197.

Higuchi et al., "IXM2: A Parallel Associative Processor for Semantic Net Processing —Preliminary Evaluation –", IEEE, Jun. 1990, pp. 667–673

Frison et al., "Designing Specific Systolic Arrays with the API15C Chip", IEEE 1990, xii+808pp., pp. 505–517.

Berg et al., "Instruction Execution Trade–Offs for SIMD vs. MIMD vs. Mixed Mode Parallelism", IEEE Feb. 1991, pp. 301–308.

Raghaven et al., "Fine Grain Parallel Processors and Real–Time Applications: MIMD Controller/SIMD Array", IEEE, May 1990, pp. 324–331.

G. J. Lipovski, "SIMD and MIMD Processing in the Texas Reconfigurable Array Computer", Feb. 1988, pp. 268–271.

R.M. Lea, "ASP: A Cost–effective Parallel Microcomputer", IEEE Oct. 1988, pp. 10–29.

Mark A. Nichols, "Data Management and Control–Flow Constructs in a SIMD/SPMD Parallel Language/Compiler", IEEE, Feb. 1990, pp. 397–406.

Will R. Moore, "VLSI For Artificial Intelligence", Kluwer Academic Publishers, Ch. 4.1.

Mosher et al., "A Software Architecture for Image Processing on a Medium–Grain Parallel Machine", SPIE vol. 1659 Image Processing and Interchange, 1992/279.

*Patent Abstracts of Japan,* vol. 8, No. 105, 17 May 1984, p. 274. App. No. JP–820 125 341 (Tokyo Shibaura Denki KK) 27 Jan. 1984.

W.D. Hillis, *"The Connection Machine"*, The MIT Press, Chapters 1, 3, and 4.

"Joho–syori", vol. 26(3), 1985–3, pp. 213–225, (Japanese).

Hayes, *Computer Architecture and Organization,* 1988, pp. 265–276.

Hamacher et al., *Computer Organization,* 1991, pp. 295–306.

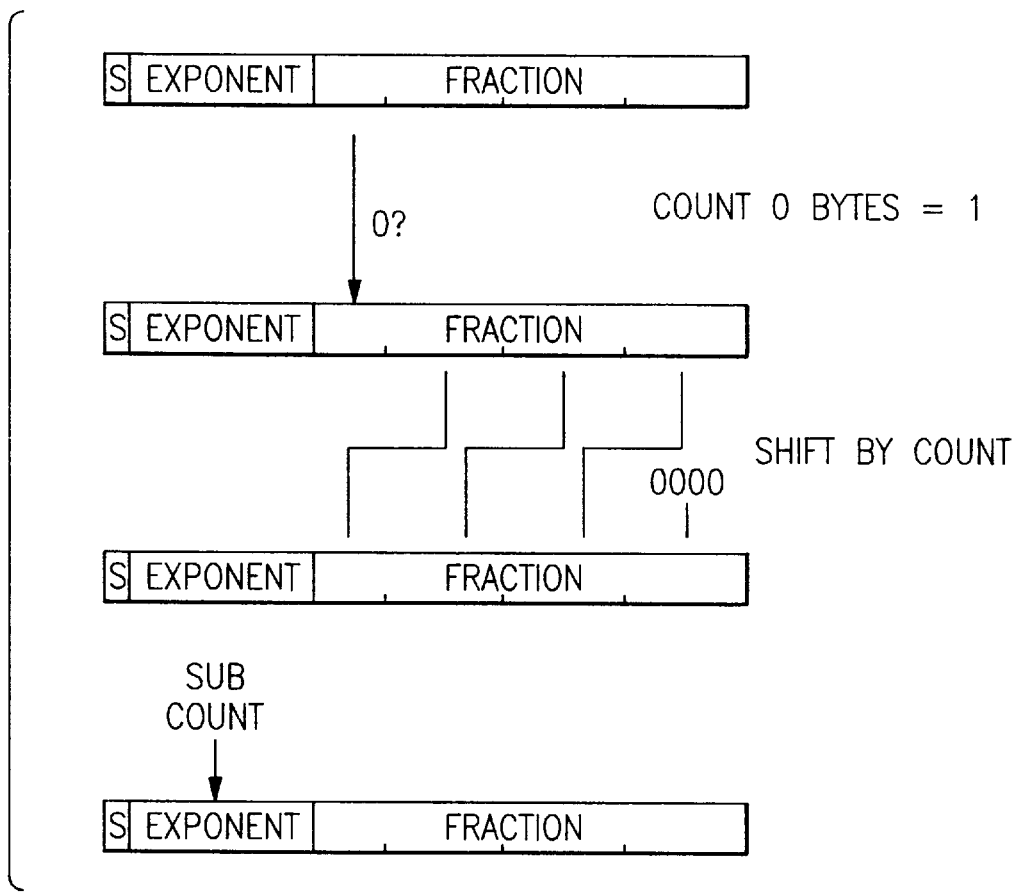

FLOATING POINT FOR SIMID ARRAY MACHINE

RELATED APPLICATIONS

This is a continuation of co-pending application Ser. No. 07/887,514, filed on May 22, 1992.

The present application claims priority and is a continuation-in-part of the following related co-pending Patent Applications:

U.S. patent application Ser. No. 07/611,594, filed Nov. 13, 1990, of J. Dieffenderfer et al., entitled "Parallel Associative Processor System", now abandoned; and U.S. patent application Ser. No. 07/798,788, filed Nov. 27, 1991, of P. M. Kogge, entitled "Dynamic Multi-Mode Parallel Processor Array Architecture", now abandoned.

In addition, this application is related to the following applications filed concurrently herewith:

U.S. patent application Ser. No. 07/877,718, filed May 22, 1992, of P. A. Wilkinson et al., entitled "Instructions within a SIMD Processing Element", now abandoned; and U.S. patent application Ser. No. 07/887,514, filed May 22, 1992, of P. A. Wilkinson et al., entitled "Floating Point Implementation on a SIMD Machine", now abandoned; and U.S. patent application Ser. No. 07/877,455, filed May 22, 1992, of P. A. Wilkinson et al., entitled "Grouping of SIMD Pickets", now U.S. Pat. No. 5,309,574; and U.S. patent application Ser. No. 07/877,456, filed May 22, 1992, of P. A. Wilkinson et al., entitled "Slide Network for an Array Processor", now U.S. Pat. No. 5,338,394; and U.S. patent application Ser. No. 07/877,256, filed May 22, 1992, of P. A. Wilkinson et al., entitled "Picket Autonomy on a SIMD Machine", now abandoned; and U.S. patent application Ser. No. 07/877,459, filed May 22, 1992, of R. R. Richardson et al., entitled "Controller Features for a SIMD/MIMD Machine", now abandoned; and U.S. patent application Ser. No. 07/877,997, filed May 22,1992, of P. A. Wilkinson et al., entitled "Array Processor Communication Network Based on H-DOTS", now U.S. Pat. No. 5,239,884, Futher this application is related to:

U.S. patent application Ser. No. 07/887,630, filed May 22, 1992, of T. Barker, et al., entitled "Advanced Parallel Array Processor", now U.S. Pat. No. 5,590,345, and U.S. patent application Ser. No. 07/888,000, filed May 22, 1992, of T. Barker, et al., entitled "SIMD/MIMD Processing Memory Element", now U.S. Pat. No. 5,625,836; and U.S. patent application Ser. No. 07/993,255, filed May 22, 1992, of T. Barker, et al., entitled "PME Store and Forward/ Circuit Switched Modes", now abandoned; and U.S. patent application Ser. No. 07/887,508, filed May 22, 1992, of T. Barker, et al., entitled "Fully Distributed Processing Memory Element", now abandoned; and U.S. patent application Ser. No. 07/887,612, filed May 22, 1992, of M. Dapp, et al., entitled "Advanced Parallel Processor Array Director", now abandoned; and U.S. patent application Ser. No. 07/888,512, filed May 22, 1992, of M. Dapp, et al., entitled "APAP Mechanical Packaging", now U.S. Pat. No. 5,211,375; and U.S. patent application Ser. No. 07/888,684, filed May 22, 1992, of T. Barker, et al., entitled "N-Dimensional Modified Hypercube", now abandoned; and U.S. patent application Ser. No. 08/887,258, filed May 22, 1992, of M. Dapp, et al., entitled "APAP I/O Programmable Router", now abandoned; and U.S. patent application Ser. No. 08/400,687, filed March 8, 1995, of T. Barker, et al., entitled "APAP I/O Zipper Connection", now U.S. Pat. No. 5,617,577; and These co-pending applications and the present application are owned by one and the same assignee, International Business Machines Corporation of Armonk, N.Y.

The descriptions set forth in these co-pending applications are incorporated into the present application by reference.

CROSS REFERENCE TO OTHER CO-PENDING PATENT APPLICATIONS

Other commonly owned Co-Pending Applications also assigned to the same assignee as the present application at the time of filing include:

U.S. patent application Ser. No. 07/250,595, filed Sep. 27, 1988, now abandoned in favor of its continuation application Ser. No. 07/519,332, now U.S. Pat. No. 4,992,933, filed May 4, 1990 of James L. Taylor entitled "SIMD Array Processor" (which was originally published as EPO application Ser. No. 88307855/88-A on May 3, 1989); and U.S. patent application Ser. No. 07/193,990, now U.S. Pat. No. 5,257,395, filed May 13, 1988, of H. Li, entitled "Methods and Circuit for Implementing an Arbitrary Graph on a Polymorphic Mesh"; and U.S. patent application Ser. No. 07/426,140, now U.S. Pat. No. 5,410,727, filed Oct. 24, 1989, of R. Jaffe et al entitled "Two-Dimensional Input/Output Scheme for Massively Parallel SIMD Computers"; and U.S. patent application Ser. No. 07/439,758, now U.S. Pat. No. 5,457,789, filed Nov. 21, 1989, of W. C. Dietrich, Jr. et al entitled "Method and Apparatus for Performing Memory Protection Operations in a Parallel Processor System"; and U.S. patent application Ser. No. 07/698,866, now U.S. Pat. No. 5,313,645, filed May 13, 1991, of David B. Rolfe, entitled "Method for Interconnecting and System of Interconnected Processing Elements".

All above referenced co-pending applications are also are owned by one and the same assignee, namely, International Business Machines Corporation of Armonk, New York.

The descriptions set forth in these co-pending applications are also incorporated by reference.

FIELD OF THE INVENTION

These inventions relate to computers and computer systems and particularly to arrays of processors and those which can execute an array of data on an array of processors, and to the implementation of floating-point calculations and representations on such machines, and to floating-point on SIMD machines.

GLOSSARY OF TERMS

ALU

ALU is the arithmetic logic unit portion of a processor.

Array

Array refers to an arrangement of elements in one or more dimensions. An array can include an ordered set of data items (array element) which in languages like Fortran are identified by a single name. In other languages such a name of an ordered set of data items refers to an ordered collection or set of data elements, all of which have identical attributes. A program array has dimensions specified, generally by a number or dimension attribute. The declarator of the array may also specify the size of each dimension of the array in some languages. In some languages, an array is an arrangement of elements in a table. In a hardware sense, an array is a collection of structures (functional elements) which are generally identical in a massively parallel architecture. Array elements in data parallel computing are elements which can be assigned operations and when parallel can each independently and in parallel execute the operations required. Generally, arrays may be thought of as grids of processing elements. Sections of the array may be assigned sectional data, so that sectional data can be moved around in a regular grid pattern. However, data can be indexed or assigned to an arbitrary location in an array.

Array Director

An Array Director is a unit programmed as a controller for an array. It performs the function of a master controller for a grouping of functional elements arranged in an array.

Array Processor

There two principal types of array processors—multiple instruction multiple data (MIMD) and single instruction multiple data (SIMD). In a MIMD array processor, each processing element in the array executes its own unique instruction stream with its own data. In a SIMD array processor, each processing element in the array is restricted to the same instruction via a common instruction stream; however, the data associated with each processing element is unique. Our preferred array processor has other characteristics. We call it Advanced Parallel Array Processor, and use the acronym APAP.

Asynchronous

Asynchronous is without a regular time relationship; the execution of a function is unpredictable with respect to the execution of other functions which occur without a regular or predictable time relationship to other function executions. In control situations, a controller will address a location to which control is passed when data is waiting for an idle element being addressed. This permits operations to remain in a sequence while they are out of time coincidence with any event.

BOPS/GOPS

BOPS or GOPS are acronyms having the same meaning—billions of operations per second. See GOPS.

Circuit Switched/Store Forward

These terms refer to two mechanisms for moving data packets through a network of nodes. Store Forward is a mechanism whereby a data packet is received by each intermediate node, stored into its memory, and then forwarded on towards its destination. Circuit Switch is a mechanism whereby an intermediate node is commanded to logically connect its input port to an output port such that data packets can pass directly through the node towards their destination, without entering the intermediate node's memory.

Cluster

A cluster is a station (or functional unit) which consists of a control unit (cluster controller) and the hardware (which may be terminals, functional units, or virtual components) attached to it. Our Cluster includes an array of PMEs sometimes called a Node array. Usually a cluster has 512 PMEs. Our Entire PME node array consists of a set of clusters, each cluster supported by a cluster controller (CC).

Cluster Controller

A cluster controller is a device that controls input/output (I/O) operations for more than one device or functional unit connected to it. A cluster controller is usually controlled by a program stored and executed in the unit as it was in the IBM 3601 Finance Communication Controller, but it can be entirely controlled by hardware as it was in the IBM 3272 Control Unit.

Cluster Synchronizer

A cluster synchronizer is a functional unit which manages the operations of all or part of a cluster to maintain synchronous operation of the elements so that the functional units maintain a particular time relationship with the execution of a program.

Controller

A controller is a device that directs the transmission of data and instructions over the links of an interconnection network; its operation is controlled by a program executed by a processor to which the controller is connected or by a program executed within the device.

CMOS

CMOS is an acronym for Complementary Metal-Oxide Semiconductor technology. It is commonly used to manufacture dynamic random access memories (DRAMs). NMOS is another technology used to manufacture DRAMS. We prefer CMOS but the technology used to manufacture the APAP is not intended to limit the scope of the semiconductor technology which is employed.

Dotting

Dotting refers to the joining of three or more leads by physically connecting them together. Most backpanel busses share this connection approach. The term relates to OR DOTS of times past but is used here to identify multiple data sources that can be combined onto a bus by a very simple protocol.

Our I/O zipper concept can be used to implement the concept that the port into a node could be driven by the port out of a node or by data coming from the system bus. Conversely, data being put out of a node would be available to both the input to another node and to the system bus. Note that outputting data to both the system bus and another node is not done simultaneously but in different cycles.

Dotting is used in the H-DOT discussions where Twoported PEs or PMEs or Pickets can be used in arrays of various organizations by taking advantage of dotting. Several topologies are discussed including 2D and 3D Meshes, Base 2 N-cube, Sparse Base 4 N-cube, and Sparse Base 8 N-cube.

DRAM

DRAM is an acronym for dynamic random access memory, the common storage used by computers for main memory. However, the term DRAM can be applied to use as a cache or as a memory which is not the main memory.

FLOATING-POINT

A floating-point number is expressed in two parts. There is a fixed point or fraction part, and an exponent part to some assumed radix or Base. The exponent indicates the actual placement of the decimal point. In the typical floating-point representation a real number 0.0001234 is represented as 0.1234-3, where 0.1234 is the fixed-point part and −3 is the exponent. In this example, the floating-point radix or base is 10, where 10 represents the implicit fixed positive integer base, greater than unity, that is raised to the power explicitly denoted by the exponent in the floating-point representation or represented by the characteristic in the floating-point representation and then multiplied by the fixed-point part to determine the real number represented. Numeric literals can be expressed in floating-point notation as well as real numbers.

FLOPS

This terms refers to floating-point instructions per second. Floating-point operations include ADD, SUB, MPY, DIV and often many others. Floating-point instructions per second parameter is often calculated using the add or multiply instructions and, in general, may be considered to have a 50/50 mix. An operation includes the generation of exponent, fraction and any required fraction normalization. We could address 32 or 48-bit floating-point formats (or longer but we have not counted them in the mix.) A floating-point operation when implemented with fixed point instructions (normal or RISC) requires multiple instructions. Some use a 10 to 1 ratio in figuring performance while some specific studies have shown a ratio of 6.25 more appropriate to use. Various architectures will have different ratios.

Functional Unit

A functional unit is an entity of hardware, software, or both, capable of accomplishing a purpose.

Gbytes

Gbytes refers to a billion bytes. Gbytes/s would be a billion bytes per second.

GIGAFLOPS $(10)^{**}9$ floating-point instructions per second.

GOPS and PETAOPS

GOPS or BOPS, have the same meaning—billions of operations per second. PETAOPS means trillions of operations per second, a potential of the current machine. For our APAP machine they are just about the same as BIPs/GIPs meaning billions of instructions per second. In some machines an instruction can cause two or more operations (ie. both an add and multiply) but we don't do that. Alternatively it could take many instructions to do an op. For example we use multiple instructions to perform 64 bit arithmetic. In counting ops however, we did not elect to count log ops. GOPS may be the preferred use to describe performance, but there is no consistency in usage that has been noted. One sees MIPs/MOPs then BIPs/BOPs and MegaFLOPS/GigaFLOPS/TeraFLOPS/PetaFlops.

ISA

ISA means the Instruction Set Architecture.

Link

A link is an element which may be physical or logical. A physical link is the physical connection for joining elements or units, while in computer programming a link is an instruction or address that passes control and parameters between separate portions of the program. In multisystems a link is the connection between two systems which may be specified by program code identifying the link which may be identified by a real or virtual address. Thus generally a link includes the physical medium, any protocol, and associated devices and programming; it is both logical and physical.

MFLOPS

MFLOPS means $(10)^{**}6$ floating-point instructions per second.

MIMD

MIMD is used to refer to a processor array architecture wherein each processor in the array has its own instruction stream, thus Multiple Instruction stream, to execute Multiple Data streams located one per processing element.

Module

A module is a program unit that is discrete and identifiable or a functional unit of hardware designed for use with other components. Also, a collection of PEs contained in a single electronic chip is called a module.

Node

Generally, a node is the junction of links. In a generic array of PEs, one PE can be a node. A node can also contain a collection of PEs called a module. In accordance with our invention a node is formed of an array of PMEs, and we refer to the set of PMEs as a node. Preferably a node is 8 PMEs.

Node Array

A collection of modules made up of PMEs is sometimes referred to as a node array, is an array of nodes made up of modules. A node array is usually more than a few PMEs, but the term encompasses a plurality.

PDE

A PDE is a partial differential equation.

PDE Relaxation Solution Process

PDE relaxation solution process is a way to solve a PDE (partial differential equation). Solving PDEs uses most of the super computing compute power in the known universe and can therefore be a good example of the relaxation process. There are many ways to solve the PDE equation and more than one of the numerical methods includes the relaxation process. For example, if a PDE is solved by finite element methods relaxation consumes the bulk of the computing time. Consider an example from the world of heat transfer. Given hot gas inside a chimney and a cold wind outside, how will the temperature gradient within the chimney bricks develop? By considering the bricks as tiny segments and writing an equation that says how heat flows between segments as a function of temperature differences then the heat transfer PDE has been converted into a finite element problem. If we then say all elements except those on the inside and outside are at room temperature while the boundary segments are at the hot gas and cold wind temperature, we have set up the problem to begin relaxation. The computer program then models time by updating the temperature variable in each segment based upon the amount of heat that flows into or out of the segment. It takes many cycles of processing all the segments in the model before the set of temperature variables across the chimney relaxes to represent actual temperature distribution that would occur in the physical chimney. If the objective was to model gas cooling in the chimney then the elements would have to extend to gas equations, and the boundary conditions on the inside would be linked to another finite element model, and the process continues. Note that the heat flow is dependent upon the temperature difference between the segment and its neighbors. It thus uses the inter-PE communication paths to distribute the temperature variables. It is this near neighbor communication pattern or characteristic that makes PDE relation very applicable to parallel computing.

PICKET

This is the element in an array of elements making up an array processor. It consists of: data flow (ALU REGS), memory, control, and the portion of the communication matrix associated with the element. The unit refers to a 1/nth of an array processor made up of parallel processor and memory elements with their control and portion of the array intercommunication mechanism. A picket is a form of processor memory element or PME. Our PME chip design processor logic can implement the picket logic described in related applications or have the logic for the array of processors formed as a node. The term PICKET is similar to the commonly used array term PE for processing element, and is an element of the processing array preferably comprised of a combined processing element and local memory for processing bit parallel bytes of information in a clock cycle. The preferred embodiment consisting of a byte wide data flow processor, 32k bytes or more of memory, primitive controls and ties to communications with other pickets.

The term "picket" comes from Tom Sawyer and his white fence, although it will also be understood functionally that a military picket line analogy fits quite well.

Picket Chip

A picket chip contains a plurality of pickets on a single silicon chip.

Picket Processor System (or Subsystem)

A picket processor is a total system consisting of an array of pickets, a communication network, an I/O system, and a SIMD controller consisting of a microprocessor, a canned routine processor, and a micro-controller that runs the array.

Picket Architecture

The Picket Architecture is the preferred embodiment for the SIMD architecture with features that accommodate several diverse kinds of problems including:

set associative processing
parallel numerically intensive processing
physical array processing similar to images

Picket Array

A picket array is a collection of pickets arranged in a geometric order, a regular array.

PME or Processor Memory Element

PME is used for a processor memory element. We use the term PME to refer to a single processor, memory and 1/0 capable system element or unit that forms one of our parallel array processors. A processor memory element is a term which encompasses a picket. A processor memory element is 1/nth of a processor array which comprises a processor, its associated memory, control interface, and a portion of an array communication network mechanism. This element can have a processor memory element with a connectivity of a regular array, as in a picket processor, or as part of a subarray, as in the multi-processor memory element node we have described.

Routing

Routing is the assignment of a physical path by which a message will reach its destination. Routing assignments have a source or origin and a destination. These elements or addresses have a temporary relationship or affinity. Often, message routing is based upon a key which is obtained by reference to a table of assignments. In a network, a destination is any station or network addressable unit addressed as the destination of information transmitted by a path control address that identifies the link. The destination field identifies the destination with a message header destination code.

SIMD

A processor array architecture wherein all processors in the array are commanded from a Single Instruction stream to execute Multiple Data streams located one per processing element.

SIMDMIMD or SIMD/MIMD

SIMDMIMD or SIMD/MIMD is a term referring to a machine that has a dual function that can switch from MIMD to SIMD for a period of time to handle some complex instruction, and thus has two modes. The Thinking Machines, Inc. Connection Machine model CM-2 when placed as a front end or back end of a MIMD machine permitted programmers to operate different modes for execution of different parts of a problem, referred to sometimes a dual modes. These machines have existed since Illiac and have employed a bus that interconnects the master CPU with other processors. The master control processor would have the capability of interrupting the processing of other CPUs. The other CPUs could run independent program code. During an interruption, some provision must be made for checkpointing (closing and saving current status of the controlled processors).

SIMIMD

SIMIMD is a processor array architecture wherein all processors in the array are commanded from a Single Instruction stream, to execute Multiple Data streams located one per processing element. Within this construct, data dependent operations within each picket that mimic instruction execution are controlled by the SIMD instruction stream.

This is a Single Instruction Stream machine with the ability to sequence Multiple Instruction streams (one per Picket) using the SIMD instruction stream and operate on Multiple Data Streams (one per Picket). SIMIMD can be executed by a processor memory element system.

SISD

SISD is an acronym for Single Instruction Single Data.

Swapping

Swapping interchanges the data content of a storage area with that of another area of storage.

Synchronous Operation

Synchronous operation in a MIMD machine is a mode of operation in which each action is related to an event (usually a clock); it can be a specified event that occurs regularly in a program sequence. An operation is dispatched to a number of PEs who then go off to independently perform the function. Control is not returned to the controller until the operation is completed.

If the request is to an array of functional units, the request is generated by a controller to elements in the array which must complete their operation before control is returned to the controller.

TERAFLOPS

TERAFLOPS means $(10)**12$ floating-point instructions per second.

VLSI

VLSI is an acronym for very large scale integration (as applied to integrated circuits).

Zipper

A zipper is a new function provided. It allows for links to be made from devices which are external to the normal interconnection of an array configuration.

BACKGROUND OF THE INVENTION

In the never ending quest for faster computers, engineers are linking hundreds, and even thousands of low cost microprocessors together in parallel to create super supercomputers that divide in order to conquer complex problems that stump today's machines. Such machines are called massively parallel. We have created a new way to create massively parallel systems. The many improvements which we have made should be considered against the background of many works of others. A summary of the field has been made in other applications which are referenced. See in this connection the related application for our Parallel Associative Processor System, U.S. Ser. No. 601,594 and our Advanced Parallel Array Processor (APAP). System tradeoffs are required to pick the architecture which best suits a particular application but no single solution has been satisfactory. Our ideas make it easier to provide a solution.

It will be understood that many different computers, from personal computers to mainframes, have been developed with the capability of handling fixed as well as floating-point arithmetic. Often there are separate processing elements or arithmetic units in chips specifically designed as floating-point units. There are even IEEE floating-point standards for various kinds of machines, e.g. 16-bit machines, 32-bit machines, etc. However, none of the prior systems implemented floating-point specifically for a SIMD machine with parallel pickets, especially one in which the SIMD is performed by executing an array of data on an array of processors. Arrays of processors which implement floating-point calculations include that application referred to above entitled: "Parallel Associative Processor System," and another which can use such a capability is "Dynamic Multimode Parallel Array Architecture," referenced above as a related application.

It is desirable to implement floating-point on arrays of processors, particularly processors which have SIMD capability. It would also be desirable if the same implementation would be applicable to MIMD and SIMIMD machines.

SIMD machines have existed for many years. R. A. Stokes et al, U.S. Pat. No. 3,537,074, issued Oct. 27, 1970, described an array computer with parallel processors and a single programmable control unit, a plurality of registers for storing counterpart vectors, mask registers, and means responsible to a sequence of one or more control unit instructions for concurrently operating on data in the vector registers. During the 1970's parallel processors described by Stokes became known as SIMD (Single Instruction Multiple Data) machines. Such machines may also be described as consisting of a programmable control unit driving an array of N parallel processors, each processor having a memory portion, an arithmetic unit, a program decode portion, and an input/output portion. The early systems were large boxes which were sometimes associated with a host mainframe. An important difference between the SIMD and the more common processors is that, within such systems all SIMD processors may have a different set of data in the associated processor, but all processors are governed by a common controller. SIMD computers are also different from a more common Von Neumann processor in that each instruction operates on a data vector rather than on a single operand.

The most common type of multiprocessor systems are Multiple Instruction Multiple Data (MIMD) systems where each processor may execute a separate program operating on a separate data set. The processors in a MIMD system may perform separate tasks, or they may each perform a different sub-task of a common main task. The processing system of the present application can perform MIMD functions.

The related applications and co-pending applications can be referenced for additional background art in the general field, some of which may be more relevant than others to the invention described here. These references are thought to be of a general background, and their discussions are not repeated here. Other references are discussed in the co-pending applications and those filed concurrently. As each of these relate to different invention, and there are many many patents and publications in the field, the cited references may be considered as background references in addition to those we discuss.

The problem which we have faced is the need to make compact processors for complex applications. In approaching this general problem, we have found that past successful SIMD designs have been restricted to bit-serial implementations with up to a few thousand bits of memory per processing element and a few processing elements per electronic chip were inadequate. As a result, we recognized a need to define an architecture which could be manufactured with dramatically higher densities and yet be suitable for an air cooled environment and could be packaged in a light and compact unit.

As a result, we created a solution which entails an N dimensional array of byte-wide processing units, each coupled with an adequate segment of byte-wide memory and control logic. A partitionable section of the array containing several processing units is contained on a silicon chip. This will be described in detail below. Our own solutions generated additional problems to be solved in order to improve performance of the system, and we have devised solutions to further the development of the propounded architecture. Some of these solutions enable independent performance of processing elements. In this connection, with hindsight review, we recognized that the prior art described in European Patent Application EP-A-208,457 described a processor array in which each processing element in the array could select the element from which it takes its input.

Co-pending application Ser. No. 07/519,332 of James L. Taylor, filed May 4, 1990, continuing U.S. Ser. No. 07/250, 595, filed Sep. 27, 1988, and entitled "SIMD Array Processor," describes a multi-dimensional array of processing elements which has an enhanced degree of flexibility providing the potential for parallel processing to be better exploited without resorting to the expense and complexity of a MIMD processor. This application was first published on May 3, 1989 in the form of a European application, EPO #88/307885/88-A and in UK-A-1,445,714; and The system there described sends a global instruction for local bit-serial execution along a bus to connect control logic in the various parallel processing elements, and it programmatically modifies selected bits of the global instruction for use on local bit lines where the modified bits are decoded.

Hindsight review has also identified a single discussion of byte-wide SIMD processor elements entitled "Design of SIMD Microprocessor Array" by C. R. Jesshope, R. O'Gorman, et al and published in IEEE Proceedings Vol. 136, May 1989. The paper presents a scholarly study of SIMD architectures by authors who are with the Department of Electronics and Computer Science at The University, Southampton, UK. Several features are similar to the matters we discuss, and they describe a processor which has a byte-wide SIMD architecture. The paper suggests processing elements with an eight bit processing accumulator architecture, a limited on board RAM (1k bytes) and multiple PEs per chip (4) as well as some significant degree of local autonomy. However, in spite of the use of this suggested structure, associative processing is not provided by the study reported in the IEEE. It will be seen that the structure suggested does not provide byte-wide neighbor communication, as is the case of the present invention. Other features which we have developed are also not suggested. Accordingly, a need exists for our picket system which is executable on an integrated circuit chip in order to advance the state of the art for parallel processing. See—"Summary of Parallel Computer Architectures", R. Duncan, which may be found in the IEEE "Computer", February, 1990.

In spite of the earlier efforts described, there appears to be nothing like the Parallel Associative Processor system or the Dynamic Multi-mode Parallel Array Architecture, referenced above, for performing SIMD, MIMD and SIMIMD processes with one machine. However, for performing many arithmetic functions with real numbers and literals, the use of floating-point notation for performing the common floating-point arithmetic calculations is important.

There are IEEE standards for computation and various processors for performing floating-point arithmetic in systems which are not like those disclosed by us, and there are some patents relating to floating-point systems. For instance, U.S. Pat. No. 4,107,773, to Gilbreath, entitled "Advanced Array Transform Processor with Fixed/Floating Point Formats" describes an example of an auxiliary processor for performing repetitive type arithmetic on strings of similar data. Typical of uniprocessors with floating-point units, this processor has a two port memory that permits data to be loaded into the memory at the same time that floating-point execution is taking place. While this patent appears to focus on indexing and control of the data array feeding and exiting the processor, it handles different formats and converts them into a common format for execution. However, it does not indicate much about the format or the actual execution of the floating-point operations. Typical of such machines, the patent describes the handling an array of input data in some sequential order and does not relate to an array of data which is executed by an array of processors such as the present invention.

U.S. Pat. No. 4,872,133, to Leeland, entitled "Floating-Point Systolic Array Including Serial Processors," does describe an array of processors. However, in this patent each processing element of the array of processors having a global bus is a serial processor. Multiple processing elements, each having a floating-point serial processor are described generally. Multiple processing elements are contained on a chip, and many chips are intended to make up a two dimensional systolic array embodiment of the system that has a global bus. While little is said about the floating-point processor, it is clear that the floating-point processor is a serial processor of the kind known at the time of filing of U.S. Pat. No. 4,872,133. It does not permit parallel word floating-point processing or make any suggestion as to how floating-point could be executed for a SIMD array of processors.

U.S. Pat. No. 4,933,895, to Grinberg, entitled "Cellular Array having data Dependent Processing Capabilities," relates to a two dimensional cellular array of bit-serial processing elements controlled in a SIMD fashion. The processing elements of the disclosure permit, as may be considered routine, adjustment of bit-serial machines for shifting one of the fractions one bit at a time until conditions are met. This feature is based on the data itself and neighboring processing elements and would be applied for an operation of an array designed to process images. In this patent, bit-serial floating- point operations are discussed in detail, but there is no discussion of what would, could, or should happen in byte-wide conditions. It describes what would happen in the implementation of the adjust portion of floating-point addition, as expected for a serial machine. First the difference of two exponents is taken; then the selected fraction is shifted until the difference in exponents is reduced to zero.

From this review, it will be seen that there have existed various kinds of parallel array machines. SIMD machines have existed. Furthermore, floating-point processors for different machines have been invented and used. However, no one has provided for a successful implementation for floating-point in a SIMD machine which processes data in byte parallel and with execution of an array of processors. There is a need for such floating-point calculation capability. In such a processor as our "Parallel Associative Processor System" and other parallel array machines which can execute data within the array of processors, the floating-point operation contains all of the ingredients for a SIMD nightmare. Each processing element (PE) or picket can contain different data, different operations, and different levels of complexity. All of these differences contribute to difficulty in doing floating-point on a SIMD machine where each element is doing the same thing. An example is the floating-point NORMALIZE operation where the goal is to reduce the leading zeros in the floating-point fraction and appropriately compensating the exponent by incrementing/decrementing it. Some elements contain numbers requiring no adjustment while others could require extensive adjustment. Accordingly, the present invention is needed.

SUMMARY OF THE INVENTION

It is an object of the present system to provide a parallel array machine which can operate in SIMD mode and which will provide floating-point representation of data and calculations with the data in an array of processors which execute the data with a multi-byte wide data flow.

Not only has the invention of the floating-point implementation provided achieved that object, but our result is on the average 2 bits more accurate than the IEEE 32-bit floating-point standard, and the implementation is applicable to MIMD, SIMD and SIMIMD architectures which execute multiple data streams located one per processing element. Furthermore, the machine can execute data-dependent operations within each processing element.

The machine can implement floating-point calculations as a single instruction stream machine having the ability to sequence multiple instruction streams using a SIMD instruction stream to operate on multiple data streams. This has not been feasible before this time.

Another object of the present invention is to have all pickets do a floating-point operation in a fixed small number of cycles. The floating-point normalize operation is a good example. With a 32-bit fraction, before normalize there can be from 0 to 31 leading zeros to be normalized. In a conventional bit at a time implementation, the worst case normalize would require 31 normalize cycles. For an array with a single controller, then, the controller would have to execute the worst case number of cycles because one of the pickets is likely to have the worst case situation. Normalized elements then stop the adjustment process and sit idle while others are still adjusting. This is not good, and the desire is to make significant improvements in cycles and complexity. This has been achieved with our approach.

It will be appreciated that in our preferred embodiment, the floating-point implementation which we have developed for parallel array processors can be used in a parallel array processor provided with a plurality of interacting picket units or PEs (pickets) on the same chip. Such a system will have a plurality of picket units (processing elements with memory). These units will be arranged in an array and the array of pickets with their memory can be used as a set associative memory. In such systems, processes which have multiple data streams may, in some instances, perform better on single instruction, multiple data (SIMD) systems. The processing system with floating-point will be part of a system integrating computer memory and control logic on a single chip, permitting replication of the combination within a chip and building a processor system from replications of the single chip. Within the chip each processing memory element can operate as an autonomous processor, and when control of an external control processor is provided, as described, the processor can operate as a SIMD mode processor with great floating-point precision.

The invention of a set associative parallel processing system on a single chip permits a smaller set of 'data' out of a larger set to be brought out of memory where an associative operation can be performed on it. This associative operation, which is typically an exact compare, is performed on the whole set of data in parallel, utilizing the picket's memory and execution unit.

In the picket array, each picket has a portion of data out of the larger set. Additionally, each picket selects one piece of data from its portion. Thus, one piece of data in each of a set of pickets comprises the set of data upon which an associative operation is performed by all pickets in parallel.

We have created a new way to make massively parallel processors and other computer systems by creating a new "chip" and systems designed with our new concepts. This application is directed to such systems. Our here and in the related applications may be viewed of our expression of the various concepts we teach in this application, and in the related applications. Components described in each application can be combined in our systems to make new systems. They also can be combined with existing technology.

We will elaborate in this and related applications Picket Processors and what we call an Advanced Parallel Array Processor (APAP). It may be interesting to note that the picket processor can employ a PME. A picket processor may be especially useful in military application where a very compact array processor is desirable. In this connection, a picket processor differs somewhat from the preferred embodiment associated with the APAP, our Advanced Parallel Array Processor. However, the commonality exists, and aspects and features which we have provided can be employed in differing machines.

The term picket refers to 1/nth element of an array processor made up of processor and memory and their included communication elements applicable for array intercommunication.

The picket concept is also applicable to the 1/nth of an APAP processing array.

While the picket concept can differ from an APAP in data width, memory size, and number of registers, it is, in the massively parallel embodiment which is an alternative to an APAP, different in that it is configured to have connectivity for 1/nth of a regular array, while a PME in an APAP is a part of a sub-array. Both systems can execute SIMIMD. However, because a picket processor is configured as a SIMD machine with MIMD in the PE, it can directly execute SIMIMD, while a MIMD APAP configuration would execute SIMIMD by using MIMD PEs controlled to emulate SIMD. Both machines use a PME.

Both systems can be configured as a parallel array processor, comprising an array processing unit for the array having 'N' elements interconnected with an array communication network wherein 1/Nth of the processor array is a processing element, it's associated memory, a control bus interface, and a portion of the array communication network.

The parallel array processor has a dual operation mode capability wherein the processing unit can be commanded to operate in either or two modes, and freely move between these two modes for SIMD and MIMD operation, where when SIMD is the mode of its organization a processing unit has the ability to command each element to execute it's own instructions in a SIMIMD mode, and where when MIMD is the implementation mode for the processing units organization it has the ability to synchronize selected elements of the array to simulate MIMD execution. We can call this MIMD-SIMD).

A parallel array processor in both systems provides an array communication network with paths for the passing of information between elements of the array. The movement of information can be directed by either of two ways, where as a first way, an array controller directs that all messages move in the same direction at the same time such that the data being moved does not define its destination, and in a second way, each message is self routed with a header at the beginning of a message defining its destination.

A segment of the parallel array processor array has plural copies of the processing unit provided on a single semiconductor chip, which each copy segment of the array including a portion of the array communication network associated with that segment and buffers, drivers, multiplexers, and control for enabling the segment portion of the array to be seamlessly connected with other segments of the array to extend the array communication network.

The control bus or path from a controller is provided for each processing unit so that the control bus extends to each of the elements of the array and controls its activities.

Each processing element segment of the parallel array, contains plural copies of a processor memory element, which is contained within the limits of a single semiconductor chip, has a segment of the array includes a portion of the array control bus and the register buffers to support the communication of controls to the array segment contained within the chip.

Both can implement mesh moves or routed moves. Normally, the APAP implements a dual interconnect structure, with eight elements on the chip interrelating in one way, while the chips interrelate in another way. The programmable routing on the chip generally causes links to be established between the PMEs as we have described, but the nodes can be and normally are related in another way. On the chip essentially the normal APAP configuration would be a 2×4 mesh, which the node interconnection can be a routed sparse octal N-cube. Both systems have inter-PE intercommunication pathways between PEs (PMEs) enabling a matrix to be made up of point-to-point paths.

With this background and perspective, we will describe in detail features and aspects of our invention related to the preferred embodiment of our invention with reference to the FIGURES. Additional details of the system can be found in the following description and in the related applications.

DESCRIPTION OF THE DRAWINGS

We will describe our preferred embodiment in relation to the accompanying drawings.

FIG. 8 illustrates the specific floating-point format of the preferred embodiment of our invention.

FIG. 9 describes the steps for accomplishing floating-point adjust, and

DETAILED DESCRIPTION OF PARALLEL ARRAY PROCESSOR ENVIRONMENT

Our preferred embodiment is described below beginning with a general discussion of the preferred floating-point embodiment. This embodiment of the floating-point implementation will preferably be used in a parallel array of processing elements (formed as pickets) and can be used in prior art parallel array processors. For that reason, in order to give a better orientation, a discussion of such systems is appropriate.

Figure 1:
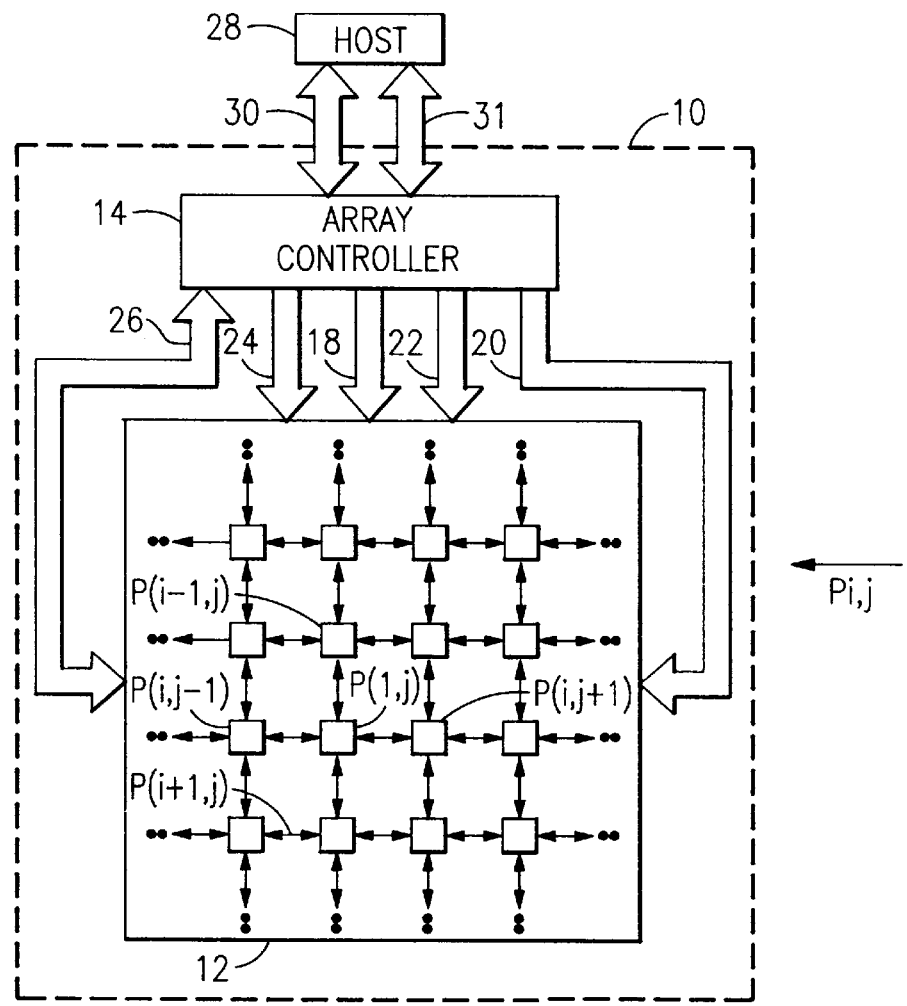
FIG. 1 is a schematic illustration of a recent SIMD processor and which is described in a co-pending application which may be considered as representative of the prior art.

Turning now to the drawings in greater detail, it will be recognized that FIG. 1 represents a typical prior art SIMD system of the type generally described in Taylor's IBM European Patent Application No. 88307855/88-A and in UK-A-1,445,714. In such prior art devices, the SIMD computer is a single instruction, multiple data computer having a parallel array processor comprising a plurality of parallel linked bit-serial processors, each being associated with one of a plurality of SIMD memory devices. The input/output I/O system acts as a staging system to the SIMD unit and comprises a temporary store for the bidirectional two-dimensional transfer of data between the host computer (which may be a mainframe or a microprocessor) and the SIMD computer. The I/O system includes input/output processing means for controlling the flow of data between the host computer and the temporary storage means and for controlling the flow of data between the temporary store and a plurality of SIMD memory devices which are usually organized as buffer sections or partitions of a larger memory. Thus, the input operation of the I/O system involves the transfer of data from the host computer memory to the temporary store and from the temporary store to the SIMD memory devices. In the second step, and for output, there is also a two step process which transfers across the two dimensional bus the data between the host computer and the SIMD computer. The input/output system for I/O transfer may be a separate unit, a sub-unit in the host, or often a unit within the SIMD computer where the SIMD controller acts as the control for the temporary I/O buffer store.

The SIMD computer itself comprises a processor array having a plurality of processing elements and a network which connects the individual processing elements and a plurality of conventional separate SIMD memory devices. The SIMD computer is a parallel array processor having a great number of individual processing elements linked and operated in parallel. The SIMD computer includes a control unit that generates the instruction stream for the processing elements and also provides the necessary timing signals for the computer. The network which interconnects the various processing elements includes some form of interconnection scheme for the individual processing elements. This interconnection can take on may topologies such as mesh, polymorphic-torus and hypercube. The plurality of memory devices are for the immediate storage of bit data for the individual processing elements, and there is a one-to-one correspondence between the number of processing elements and the number of memory devices which can be the aforementioned buffer partition of a larger memory.

For example, as illustrated in FIG. 1, there is provided a host processor 28. This processor is used to load microcode programs into the array controller 14 (which includes a temporary store buffer) to exchange data with it and to monitor its status via a host-controller data bus 30 and an address and control bus 31. The host processor in this example could be any suitable general purpose computer such as a mainframe or a personal computer. In this prior art example, the processors of the array are illustrated as on a 2-D basis, but the array could be organized differently as on a 3-D or 4-D cluster arrangement. The SIMD array processor comprises an array 12 of processing elements P(i,j), and an array controller 14 for issuing the stream of global instructions to the processing elements P(i,j). While not shown in FIG. 1, the prior example has processing elements which operate on a single bit at one time, they have associated there a block of storage which is a partition in memory associated with the processing element. The processing elements are connected by a so called NEWS (North, East, West, South) network to their respective neighbors by bidirectional bit lines. Thus, the processing elements P(i,j) are connected to the processing elements P(i−1,j), P(i,j+1), P(i,j−1), and P(i+1,j) in the Northern, Eastern, Western and Southern directions respectively.

In this typical example, the NEWS network is toroidally connected at its edges so that the Northern and Southern Edges are bidirectionally interconnected. The Western and Eastern edges are similarly interconnected. In order that data may be input to and output from the array of processors, a controller-array data bus 26 is connected to the NEWS network. As shown it is connected to the East-West boundary of the array. It could be connected instead or additionally to the North-South boundary by means of bidirectional tristate drivers which are connected to the toroidal East-West NEWS connection. As in the preferred embodiment which will be described, 1024 processing elements would be achieved by the prior art if the number of processing elements were in this example 32×32 instead of the illustrated 16×16. In the illustration a single line indicates a single bit line while a double line connecting functional elements is used to represent a plurality of connection lines or a bus.

In this prior example, the array controller issues instructions in parallel to the processing elements via an instruction bus 18 and issues row select and column select signals via row select lines 20 and column select lines 22, respectively. These instructions cause the processing elements to load data from storage, to process the data and then to store the data once more. For this purpose each processing element has access to a bit slice (section or buffer) of main memory. Logically, therefore, the main memory of the array processor is separated into 1024 partition slices for a 1024 processing element array. This means that up to thirty-two 32-bit words can be transferred into or out of storage at one time in a transfer step. To perform a read or write operation, the memory is addressed in terms of an index address which is supplied to the memory address lines via an address bus 24. A read or write instruction is supplied to each of the processing elements in parallel. During a read operation, the row and column select signals on the row and column select lines identify the processing element that is to perform the operation. Thus, in the described example, it is possible to read a single 32-bit word from memory into the thirty-two processing elements in a selected row when the array is 32×32. The processing element is associated with the slice, or block of memory (i,j) which is one bit wide. While the slice or block memory is logically associated on a one-on-one basis with the associated individual processing element, it may be and typically is, physically separated on another chip. We do not know how, with this prior architecture, the described array processor could be manufactured as can our picket be manufactured with an array of processors and adequate memory on a single chip of the kind we describe below.

Processing elements P(i,j) of the prior example themselves should be understood to comprise an ALU, with input and output registers which will include a carry, each of which is able to store a single bit of information. There is a multiplexer which is connected to the ALU input, output and also to the bidirectional data port of the slice of memory (i,j) associated with the individual processing element P(i,j).

There are separate instruction and data buses, and the array controller has a microcode store in which the microcode defining the processing to be performed by the array is loaded by the host 28 using the data bus 30 and the address and control bus 31. Once the operation of the array controller has been initiated by the host 28, the sequencing of the microcode is controlled by the microcode control unit which is connected to the microcode store within the array controller 14. An ALU and register bank of the array controller are used in the generation of array memory addresses, loop counting, jump address calculation and general purpose register operations which are output on an address bus of the array controller. The array controller also has mask registers for decoding row and column mask codes, and the specific operation codes pass to the processing elements over an instruction bus. In this example, the array controller could have a data buffer within the controller but functionally between the host controller data bus and the controller array data bus. From this buffer, the data is loaded under control of the microcode in the control store into the array of processors, and vice versa. For this purpose the buffer is arranged as a bidirectional FIFO buffer under control of a microcode control in the array controller. More details of such prior systems may be found by reference to the above cited examples, particularly in Taylor's SIMD Array Processor, U.S. Ser. No. 07/519,332.

Figure 2:
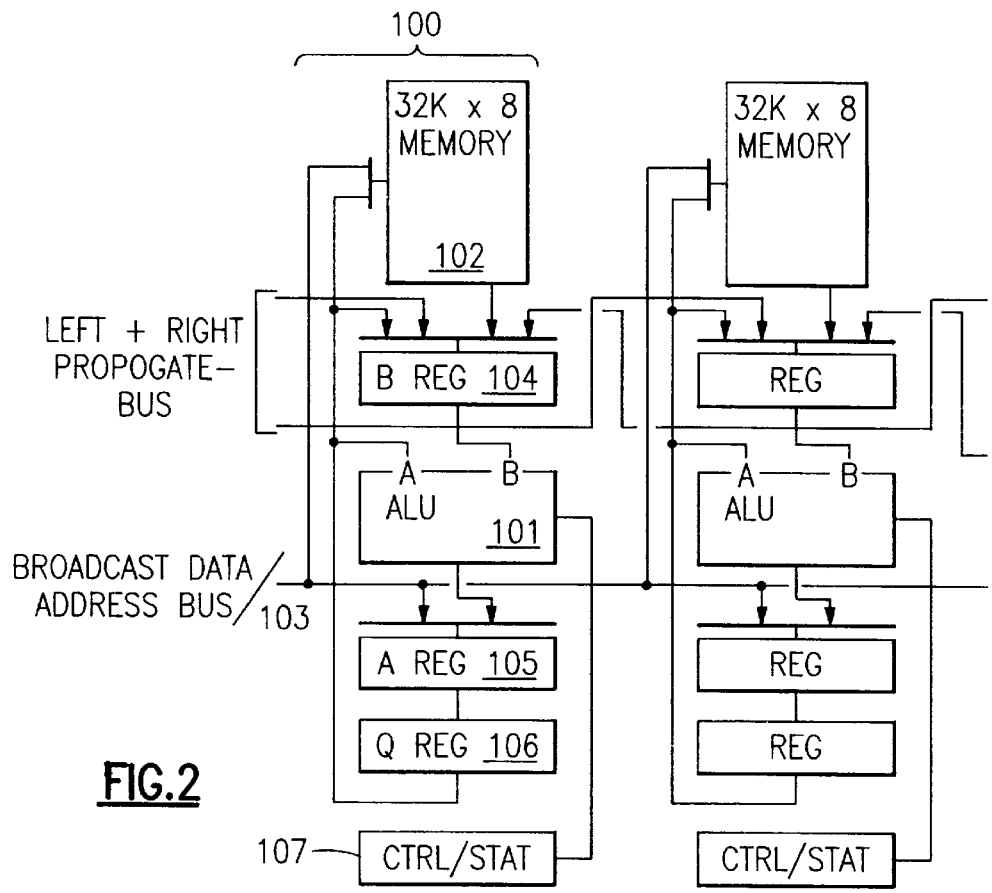
FIG. 2 illustrates a pair of the basic picket units which are configured on a silicon base with processor, memory, control logic and associative memory with byte communication with the other pickets in the array.

A review of the foregoing prior attempts may be compared to the preferred embodiments of the invention that we describe. FIG. 2 illustrates the basic picket unit 100, comprising a combined processing element ALU 101 with a local memory 102 coupled to the processing element for processing one byte of information in a clock cycle. As illustrated, the picket unit is formed on a silicon base chip or picket chip with a linear array of pickets with neighbors to the side (to the left and right in the figure) such that on a silicon base chip there is formed a picket processing array with a plurality of local memories, one for each of the byte-wide processing data flows arranged in a logical row or in a linear array with neighbor communication buses for passing data bidirectionally to the right and left. The collection of pickets in a picket chip is arranged in a geometric order, preferably horizontally on the chip. FIG. 2 shows the typical implementation of two pickets of the picket array on a picket chip with multiple memory and dataflow including communication paths between each picket's processing element and memory. In our preferred embodiment, the data communication paths between the one-on-one memory with the processing elements of the array is byte-wide and across, left or right with a neighbor or with a "slide" for communication with picket processors farther away.

A "slide" may be defined as means for transferring information in a single cycle to a non-neighbor position through a picket address location which would normally be able to receive the information were it not transparent to the message being sent until it arrives and is received at the nearest active neighbor which receives it. Thus, a slide functions by sending information to a non-neighbor position across "turned off" pickets. Assume that picket "A" wants to transfer information to a remote picket "G". Prior to that cycle, intervening pickets are made transparent by turning these "B" through "F" pickets off. Then, in the next single cycle "A" sends his message to the right and in doing so passes through "B" through "F" which are transparent because they are turned off and "G" receives the message since it is still turned on. In the normal use of the "slide" information is transferred linearly across the lattice, but the slide approach can also work with a two dimensional mesh or in a multi-dimensional array.

The access of the processing elements in our preferred embodiment is not bit-serial in operation, but rather byte serial. Each processor has access to its own coupled memory rather than access to a block of local memory and an associated partition or page thereof. Instead of one bit, a character wide, or character multiples wide bus is provided. Instead of a bit, a byte (or in future systems envisioned to duplicate the performance of a character byte, multiple bytes) of information is processed in one clock cycle. Thus, 8, 16 or 32-bits may flow between each picket processing element to match the width of the associated memory. In our preferred embodiment, each picket chip has 8 (9) bits wide memory of 32 Kbytes and preferably 16 pickets with this 32 Kbytes each of storage per picket node of the linear array. In our preferred embodiment, each associated memory is founded in CMOS as DRAM, and a character byte is 9 bits (which functions as an 8 bit character with self checking).

The parallel-path byte-wide bus data flow between pickets and between the processing element and its memory is a substantial improvement over the serial bit structure of the prior art systems. But, it will also be recognized after this achievement is understood that the increased parallelism results in additional problems which need solution as one grows into the understanding of the implications of the newly achieved architecture. Important solutions are described.

One feature which will be appreciated is that in addition to the left and right neighbor transfers and the slide mechanism which we have described with reference to the drawings, we have provided also a broadcast bus which is double byte-wide, so that all pickets can see the same data at the same time. picket control and address propagation is also transferred on this broadcast bus. It is this bus that supplies the comparison data when performing set association operations and other comparison or synchronous math operations.

The tasks that have highly parallel data structures that lend themselves to processing within the picket data processing elements under the control of a single instruction stream include applications in artificial intelligence pattern matching, sensor and track fusion in multi-sensor optimal assignment, context searching and image processing. However, many of these applications now possible were not used in SIMD processes because of the serial bit processing under a single clock time. For example, the traditional serial processing element of a SIMD machine executes one bit of an ADD operation for each processor cycle, while a 32-bit parallel machine can execute thirty two bits of an ADD in one cycle.

The configuration of 32 KB per processing element applies far more memory logically available to each processing element than the traditional SIMD machine provides.

Pin count on the chip has been held low because the data which is passed into and out of the chip has been kept to a minimum. The DRAM memory is a conventional memory CMOS array and one that supports "row-column" access by deleting the column demultiplexing on the back of the memory array and by providing a row address that reads out a row of the memory array to the data flows in parallel.

The memory, in addition to data, contains "tri-bits" or "trit", so that there are three states recognized by the logic, instead of the traditional binary digit, either logic 1, logic 0, or "don't care". The "don't care" in a match field matches either a logic 1 or logic 0. The trit is contained in successive storage locations in the storage array. Masks are another form of data stored in memory that is directed to the mask register of the picket processing element.

As the storage array can contain commands, this allows one picket to do a different operation from another picket. On-chip control of individual pickets during operations involving most pickets, but not necessarily all pickets, allows implementations which are unique for SIMD operations. One simple control function provided is that of suspended operations in any picket whose status output meets a specific condition. Thus, a non-zero condition may mean a "doze". Doze is a condition which suspends operations and turns the picket into an inactive but aware status. Another command provided is one which can inhibit or enable write to memory based on conditions in the picket or based upon a command provided to the bus prior to a slide operation.

By applying to a picket chip 16 powerful pickets, each with 32 KB memory, only 64 chips provide 1024 processors and memory of 32768 KB. The array of pickets comprises a set associative memory. The invention is also useful for numerically intensive processing image analysis as well as vector processing. This powerful picket processing array can be packaged today on only 2 small cards! It will be seen that thousands of pickets can be appropriately packaged in a more portable low power package, enabling image processing applications to be performed with minimal delay or within video frame time, for instance, during the flight of an airborne craft without significant payload consideration.

The power of the pickets leads to the possibility of use of large associated memory systems packed into close quarters and enables the use of the processing power in a variety of applications after the systems designer becomes accustomed to use of the new system.

Figure 3:
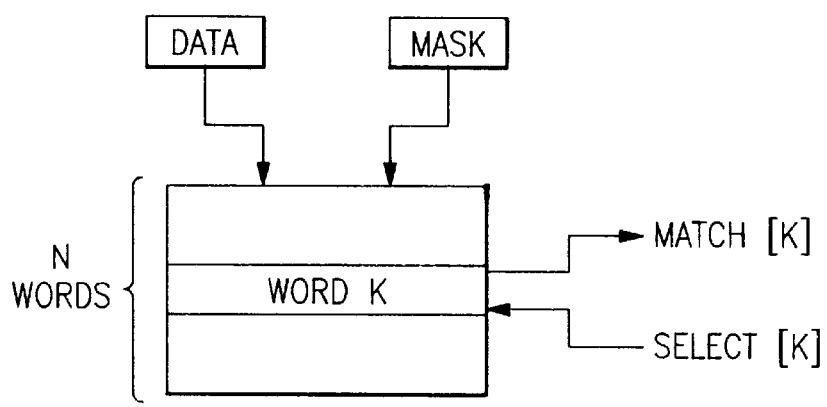
FIG. 3 illustrates associative memory processing.

FIG. 3 illustrates what might be termed fully associative memory in that, when an association is requested, a compare value is presented to all memory locations and all memory locations simultaneously respond with their match lines. Associative memory is known by itself in the art. In the system herein described, using parallel pickets of memory and processing elements which have byte transfers in order to perform a search, there is an input of data and a mask for a search in order to locate a word K among N words in memory. All matching pickets raise a status line, and then a separate operation reads or selects the first match K. This operation, commonly called set associative, can be repeated for successive words up through the picket memory. Similarly, writing is achieved via a broadcast operation in which a raised select line indicates participation and broadcast data is copied to all selected pickets.

Another embodiment, although not the preferred one reduces the amount of DRAM memory available for each picket to allow inclusion of a section of fully associative memory of the type portrayed in FIG. 3. If, say 512 bytes of fully associative memory were included, then every picket could contain a set of search indexes. Thus, in a single operation, 512 times 1024 pickets yields 512k compares per operation, or 512 Gig-compares per second at one microsecond per operation. With extensibility, the concept can be advanced into the multiple Tera-compare range. This embodiment empowers associative tasks that involve extensive searching for information with capabilities well in excess of computing capabilities available today.

With this association operation using memory and byte-wide coupled processing elements, as illustrated in FIG. 2, in addition to the applications of distinct algorithms or operations, artificial intelligence, and parallel programming attempted in SIMD situations, there are many additional applications now available for the machine with the configuration of the chip we describe in a SIMD environment which may include:

simple parallelizable arithmetic tasks, including matrix multiply and other tasks which can be performed in specialized memory machines;

image matching, and image processing tasks which can be performed in Von Neumann machines but which can be speeded up considerably with the applications adaptable to the extreme parallelism, for instance pattern matching of a three dimensional image;

data based query functions;

pattern matching in the Artificial Intelligence arena;

network control in bridges to rapidly identify messages that go to a user on the other side of a bridge of a network;

gate level simulation; and checkers for VLSI ground rules violations.

Process tasks which take advantage of the bank of memories and associated processing elements will occur to application programmers as they develop applications which take advantage of the power of the new system architecture.

In taking advantage of our new system architecture, process changes will enhance the usual application. A process of keeping a description of a digital system can be enhanced by the use of the array to describe one gate or logic element per picket 100. In such a system, the process would begin by assigning each gate description as a list of signals that the gate accepts as inputs and naming the signal it generates. We would include a step which requires that each time a signal changes, its name is broadcast on bus 103 to all pickets and this name is compared in parallel with the names of expected input signals. If a match is found, a subsequent step records in the picket a new value of the signal in a dataflow register bit. When all signal changes have been recorded, such an enhanced process would cause all pickets to read out in parallel a control word which tells their data flow how to use the current set of inputs to compute the output. The process would then cause these computations to be performed in parallel, with the results compared with the old value from the local gate. Subsequently the improved process should record as a dataflow status bit all of those gates of the pickets whose outputs change. Then, the process would cause an external controller to interrogate all the pickets and ask for the next gate that changed. Then, the system would be caused to broadcast the appropriate signal name and value from the picket to all other pickets, as originally stated, and repeat the cycle until no more signal changes occur or until the process is stopped.

Another process which could be developed to use our system would be a dictionary name search. In a dictionary name search names should be stored in picket memory 102 such that the first letter of all names can be compared with that of the desired broadcast name on broadcast data address bus 103. All pickets without a match are turned off with the control characteristic we provide. Then, the second letter is compared and the compare and turnoff procedure is repeated for successive letters (characters) until no active picket units remain or until the end of the word has been reached. At this point the remaining picket units are queried, and the index of the desired data is read out by the sequencer.

Figure 4:
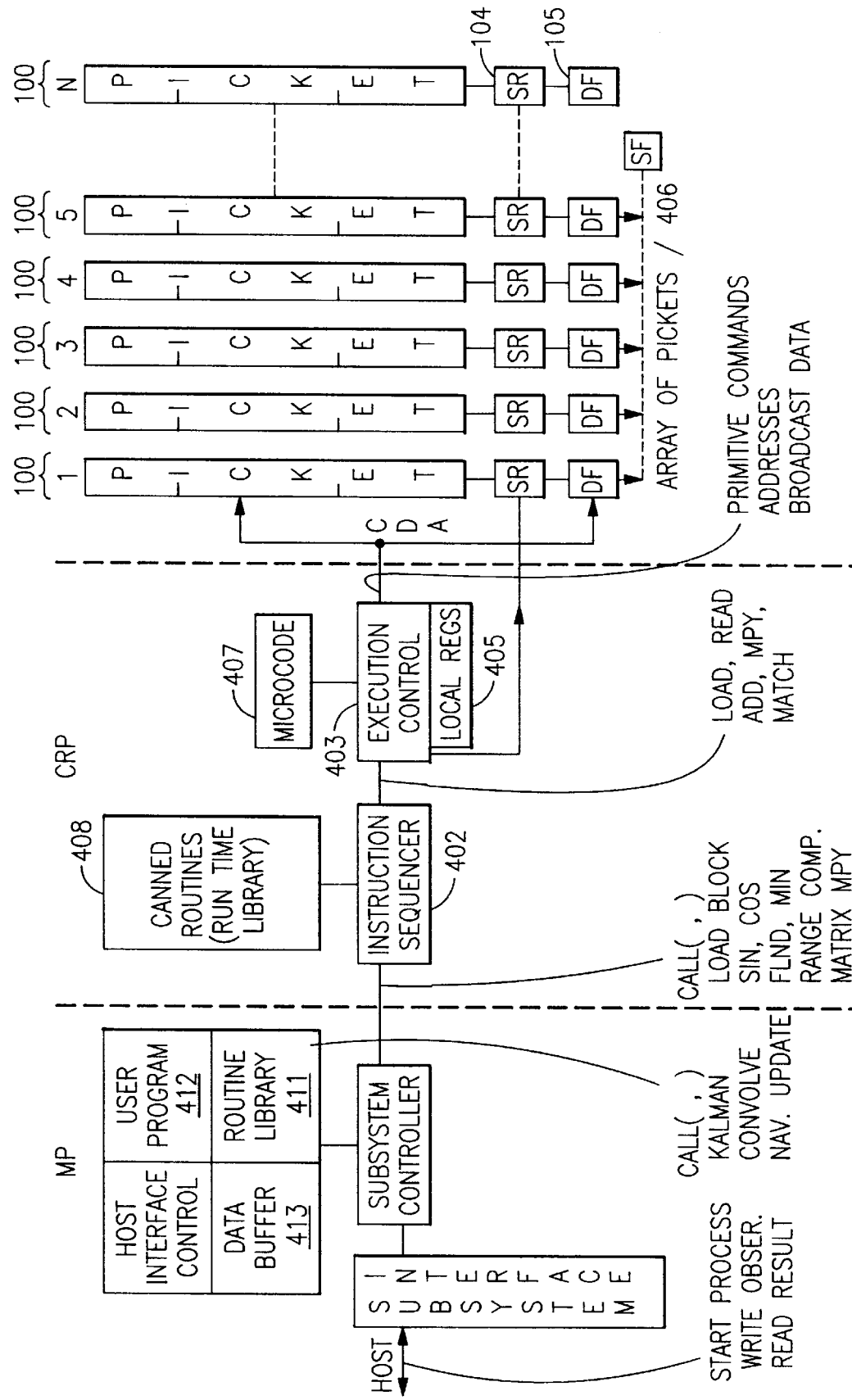
FIG. 4 illustrates a basic 16 (n) picket configuration for a SIMD subsystem which employs a microprocessor controller, a hard-wired sequencing controller for canned routines. The picket array which forms the basic parallel picket processor system may also be a standalone unit.

FIG. 4 illustrates a basic picket configuration of a plurality of parallel processors and memories, picket units, arranged in a row on a single silicon chip as part of a parallel array which may be configured as a SIMD sub-system, illustrating the control structure of such a system. Therein also is illustrated the control processor and the supervisory microprocessor. In FIG. 4, there is illustrated memory and parallel processing element logic on the same chip which within the FIG. 4 are shown in the section labeled Array of pickets. Each memory is n bits wide, preferably a character wide, 8 (9) bits, as we have said, but conceptually also having a word width of multiple bytes wide memory. Thus, the memory portion of the parallel picket processor element will be preferably 8 (9) bits wide, or alternatively, 16 or 32 bits wide. With current CMOS foundry technology, we prefer to use an 8 bit or character wide associative memory (9 bit wide byte with self checking) with each picket processing element. The memories are directly associated one-on-one with a coupled processing element which includes an ALU, mask registers (A & Q used for masking), and a latch 104 (SP in FIG. 4), as well as status registers 107 and data flow registers A 105 and Q 106 (DF in FIG. 4) which are illustrated in greater detail in the picket diagram of FIG. 2. The DRAM and logic of each picket processor do not have any burden of an interconnection network to contend with, for there is a direct one-on-one association between the multi-bit wide DRAM memory and its processing element on the chip itself.

It will be noted in FIG. 4 that the slide B register latch (SR) 104 is placed logically between the memory and the associated logic of the ALU of the processing element and that the latch becomes, in essence, a coupling port for each processing element along the picket array. Each picket chip comprises a plurality of parallel picket processing elements arranged in a line (which is illustrated as a straight bus) for communication with the picket control. A vector address bus is common to the memory, and a data vector address register controls what data passes across to each memory.

FIG. 4 also illustrates the interconnection between the main or microprocessor card (MP) which in our preferred embodiment is a 386 microprocessor configured as a PS/2 system with a subsystem controller through which global instructions pass to a canned-routine processor (CRP) which we have provided and which provides the instructions for an instruction sequencer 402 and execution control 403 which executes the specific microcode called for by the instruction sequencer. This instruction sequencer might be analogized to a controller in function. However, also within the canned routine processor CRP we have provided local registers 405 which together with the local regs ALU (not shown) provide the basis for all addressing that is broadcast to all of the pickets within the picket array 406. In this way, address calculations are performed for all of the pickets in one ALU without using picket resources or conceivably without using picket execution cycles. This important addition adds control flexibility to the picket array, permitting doze, inhibit, and other control functions for specialized. tasks to be performed and permitting pickets to be separated from any broadcast instruction or data function.

The instruction sequencer 402 with the loaded microcode 407 broadcasts to the array of pickets for execution under the SIMD instruction sequence determined by the main program microprocessor MP and by the canned routines of the canned- routine processor CRP run time library 408 to enable SIMD processing of data contained in the array of pickets.

The instructions provided to the microprocessor MP via the subsystem interface are conceived to be high level process commands that might include Start Process, Write Obser. and Read Result which are passed to the microprocessor by the subsystem controller of the microprocessor MP. The microprocessor can be considered as the main system or control processor in the subsystem arrangement illustrated in FIGS. 4, 5, 6 and 7. it will be understood that this unit could also be a standalone unit with the addition of a peripheral input device (not shown) such as a keyboard and display unit. In this standalone configuration, the system MP could be considered to be a commercial PS/2 to which cards which include the sequencer card (which configures the canned-routine processor) and the processor array cards are inserted along the lines illustrated in FIG. 7. The routine library 411 can contain routine sequences for overall control of a process, such as CALL (,); Kalman, Convolve, and Nav. Update. The selection of these routines is via the user program, and thus the overall processing can be under the control of an external host or under control of the user program 412 located in the MP. A data buffer 413 is provided in MP memory for data transfers into and out of the parallel picket processor system. The instruction 402 sequencer is configured to execute the control stream from the MP as well as the canned-routines that reside in the canned-routine run time library memory 408. Some of these routines include CALL (,), Load Block, Sin, Cos, Find, Min, Range Comp. and Matrix Multiply from canned-routines provided by the canned-routine runtime library 408.

Within the CRP is also microcode 407 for the execution control of lower level functions like Load, Read, Add, Multiply, and Match functions.

We prefer and provide an external FOR/NEXT control for each processing unit. We also provide a deterministic floating-point byte normalize implementation.

The use of a deterministic approach to macro development for the system, which we have provided, permits picket grouping and GROUP control. A local doze function is provided to accommodate individual picket processing variations.

Should the user program require execution by the array of processors, primitive commands, addresses and broadcast data are provided to the array of picket processors.

The particular function which each part of the system utilizes is determined by the task to be performed and is assigned during compilation of the user program.

The flexibility of the subsystem may be illustrated by a rather common problem. Take, for example, a matrix multiplication problem . . . |x|* |y|=|z|.

This would be described as the problem of:

$$\begin{vmatrix} x1 & xR+1 & \ldots & \\ & & & \\ R & & \times M & \\ & & & \\ xR & x2R & \ldots & xR \times M \end{vmatrix} \times \begin{vmatrix} y1 & yM+1 & \ldots & \\ & & & \\ & & & \\ yM & y2M & \ldots & yM \times C \end{vmatrix} = \begin{vmatrix} z1 & zR+1 & \ldots & \\ & & & \\ R & & & \\ & & & \\ zR & z2R & \ldots & zR \times C \end{vmatrix}$$

Which would be solved by the following statement adjacent which is illustrated the number of passes and number of clock cycles per pass is stated offered by way of example.

|    |                              | passes | cycles/pass |
|----|------------------------------|--------|-------------|
| 01 | Call Matrix Mult Fx          | 1      | c           |
|    | (R,M,C,Xaddr, Yaddr, Zaddr)  |        |             |
| 02 | xSUB = ySUB = zSUB = 1       | 1      | 3           |
| 03 | D0 I = 1 to C                | 1      | 3           |
| 04 | D0 J = 1 to R                | C      | 3           |
| 05 | z = 0                        | CxR    | 5/6*        |
| 06 | D0 K = 1 to M                | CxR    | 3           |

-continued

|    |                                           | passes | cycles/pass |
|----|-------------------------------------------|--------|-------------|
| 07 | *Assign to associative parallel processor* | | |
| 08 | Zz = Xx × Yy + Zz                         | CxRxM  | 204/345*    |
| 09 | *Return result*                       |        |             |
| 10 | xSUB = xSUB + R                           | CxRxM  | 2           |
| 11 | ySUB = ySUB + 1                           | CxRxM  | 2           |
| 12 | NEXT K                                    | CxRxM  | 3           |
| 13 | xSUB = xSUB − MxR + 1                     | CxR    | 2           |
| 14 | ySUB = ySUB − M                           | CxR    | 2           |
| 15 | zSUB = zSUB + 1                           | CxR    | 2           |
| 16 | NEXT J                                    | CxR    | 3           |
| 17 | xSUB = 1                                  | C      | 2           |
| 18 | NEXT z                                    | C      | 3           |
| 19 | END Call                                  | 1      | 1           |

Note
*Fixed Point (4 byte)/Floating-Point (1 + 4 Byte) - see below.

From the above example, it will be seen that the task identified by the above statement 08 requires about 98% of the cycle time. Accordingly, it is assigned to the SIMD organization of the parallel picket processor. The other processes take only 2% of the cycle times and are maintained in the architecture within the microprocessor.

Accordingly, a review of this example of matrix multiplication would be assigned for execution (and each statement upon compilation would cause execution in a specific system location) to either the MP, the CRP, the local registers (LR), or to the picket array.

In the above example of matrix multiplication, the statement 01 would be assigned to the main processor MP, while statements 02, 05, 10, 11, 13, 14, 15, and 17 would be assigned to the local registers LR. Statements 03, 04, 06, 12, 16, 18, and 19 would be assigned for execution within the canned-routine processor CRP, with the otherwise time consuming matrix processing thus assigned for execution under the single instruction to the array of pickets and with assignment of the statement 08 to the array of pickets.

Figure 5:
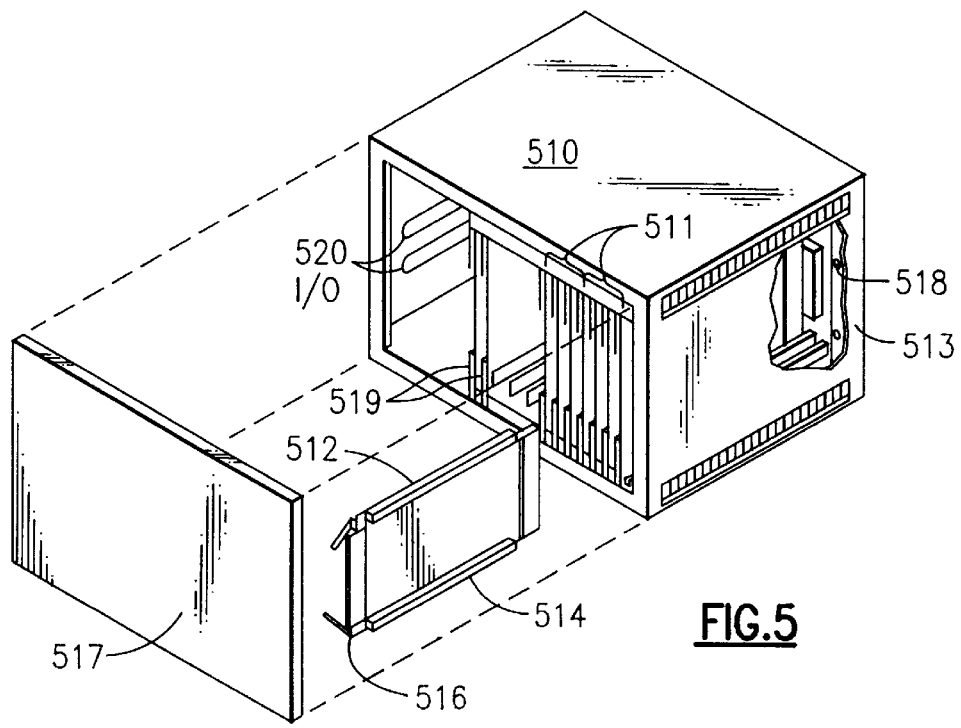
FIG. 5 illustrates a multiple picket processor system which incorporates a plurality of picket processors of FIG. 4.

FIG. 5 represents a multiple parallel picket processor system 510 which incorporates a plurality of parallel picket processors. For applications such as multiple target tracing, sensor and data fusion, signal processing, artificial intelligence, satellite image processing, pattern/target recognition, and Reed Solomon encode/decode operations, we have created a system which can be configured in a preferred embodiment as a SIMD system with 1024 parallel processors with two to 4 SEM E cards 511 (here represented as 4 cards per system) for each 1024 processors. The individual cards 512 are insertable in the rack-mount system compartment 513 with wedgelock slides 514, and the cards are provided with insertion/extraction levers 516 so that when the cover 517 is closed it effectively encloses a mountable system in a rack with 32 or 64M byte storage, with a performance capability of approximately 2 billion operations per second. The system is compact, and an array of a plurality of pickets is plugged into a backpanel board 518 which has logic and which allows interconnection of a plurality of cards.

The processor with 32M byte storage is formed on 4 SEM E cards, and the system weighs only about 30 pounds. Power is provided by power supplies 519 as illustrated. Power requirements for the air cooled processor of such power is estimated to be only about 280 watts. Each SIMD system has two I/O ports 520 for channel adapter communication to associated mainframes or otherwise to the rest of the world. With the illustrated multiple parallel picket processors each consisting of 4 logic pages and using standard modular avionics packaging and bus structure for attachment to an external memory (e.g. PI, TM and IEEE 488 buses), the processor may attach via the I/O port to the memory bus of a mission processor and may be viewed as an extension of a mission processor memory space.

With the illustrated multiple parallel picket processor comprising 1024 parallel processing elements, each processor has 32 Kbytes of local memory, and the associated path to the picket parallel processor is 8 bits or character wide (9 bit) parallel.

Processors within each picket exchange data with other neighbor processors and between pages via a backplane interconnection network, preferably a crossbar, but alternatively a Slide Crossbar, a Shuffle Network, a Base 3 N-Cube or a Base 8 N-Cube.

Figure 6:
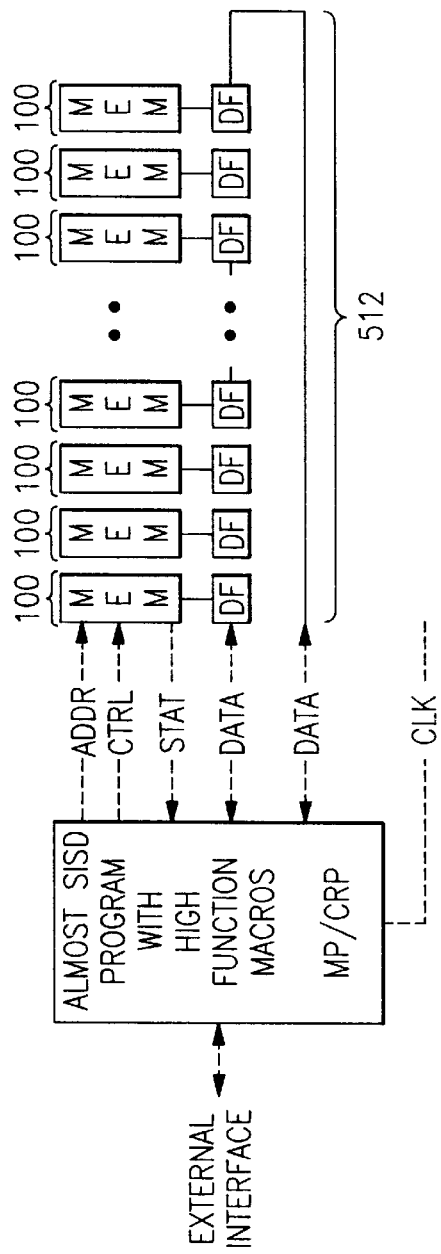
FIG. 6 is a subsystem functional block diagram.
Figure 7:
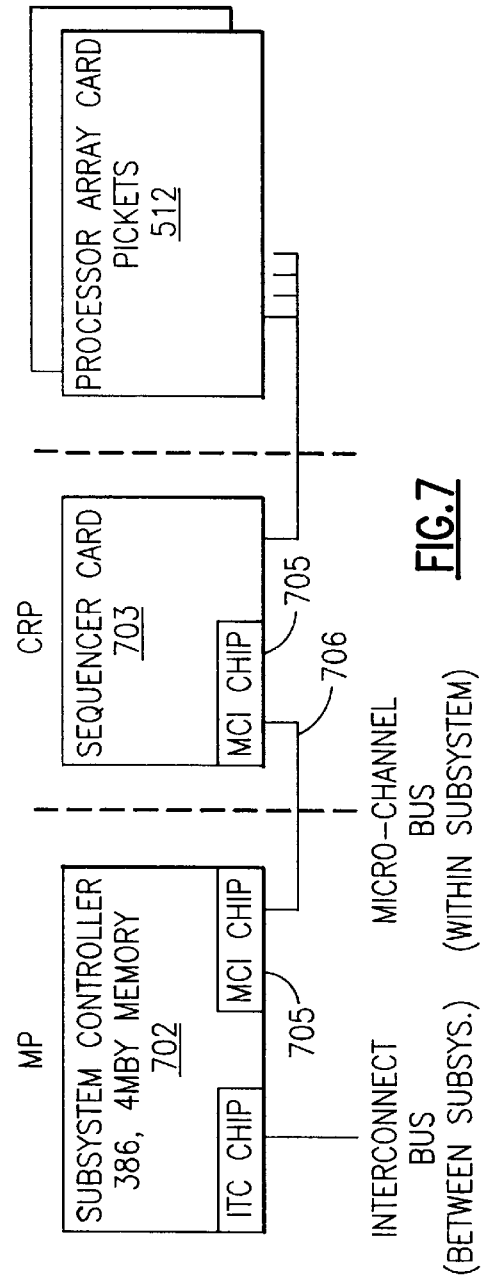
FIG. 7 further illustrates a subsystem controller's arrangement with the cards of FIG. 5.

Individual picket processors of the system are contained within a two card pack of the four cards, and the PS/2 microprocessor on one card, while the canned-routine processor sequencer is contained on the other of the four cards which comprise the system schematically illustrated in FIGS. 6 and 7. Individual pickets 100, or cards of pickets 512 can be configured on the fly with the canned routine processor CRP to enter or can drop out of operations based on data conditions as controlled by the latch 104 architecture and the local registers 405 which are coupled to the execution control of the sequencer card CRP 703. Thus, picket processors can independently perform the alignment and normalization operations which are associated with floating-point operations.

Processors are controlled in parallel by a common sequencer. The sequencer card 703 contains the controller CRP of the picket processor and may cause the picket process to execute a single thread of instructions, coded to execute on the array of SIMD processors in byte sequential fashion similar to classical bit-serial processing as well. The controller has three layers. Micro-control for the pickets is microcoded similar to modern processors, and is transferred in parallel to all of the pickets. The Microcontrol and the pickets are synchronized to the same clock system CLK, so that the functions controlled by the sequencer can be executed in the same clock time. Feeding commands to the micro-control sequencer is the function of the canned-routine processor. This sequencer card 703 is a hardwired controller that during most functions executes loop control commands and recursively starts new micro-control sequences. This controller with its canned-routine library 408 and with its looping function keeps the pickets well fed, and not command bound. The canned-routine processor controller CRP contains a large collection of macros that are called by the main system, which in the subsystem acts as a primary supervisory picket controller. This is the top control system of the picket array. It is a 386 microprocessor that manages the activity of the array of pickets. At a given moment, all pickets of the array may execute the same instruction although subsets of processors may react individually to the control flow.

There are several variations of the individual reactions so that, by virtue of the byte control function for each picket (doze, inhibit, etc.) there is local autonomy of which programming may take advantage and which may be provided and put under control of the system during compilation of a program.

In addition, as has been described, there is local memory addressing autonomy. The SIMD controller sequencer supplies a common address for all of the pickets to use. Each picket can augment that address locally to enhance its ability to do data-dependent memory accesses.

In addition, a picket can participate or not participate in the array activities depending on local conditions.

With this characteristic, it is now possible to introduce the concepts of groups to SIMD processing, by providing a means for each picket to assign itself to one or more of several groups. Processing can proceed based on these groupings where a change of configuration can happen essentially on-the-fly. In one embodiment, only one group or combination of groups can be active at one time and each executes the same SIMD instruction stream. Some operations require working only with a subset or group of pickets. Programming can take advantage of this capability. Local participation autonomy is geared to work that way. Obviously, the more pickets that are computing, the better it is.

One way to increase the number of participating pickets is to allow each picket to execute its own instruction stream. This is essentially MIMD within SIMD. Now it is possible to essentially configure the same SIMD machine as a MIMD system or a machine of still a different configuration. This is because it is possible to program the picket to operate with its own sequence of instructions.

Because each picket can be made to have its own sequence, decoding a very simple set of instructions at the picket level is possible, and this allows more extensive local processing to take place. The areas where this function is most likely to find initial application is in complex decision making, however simple fixed point processing will be another area of interest to programmers.

A simple such program would load blocks of a picket program, say not to exceed 2K into picket memory 102. These can be executed when the SIMD controller card 703 initiates local execution through the execution control beginning at a specified xyz address. This would be continued as the controller either counts off so many clocks or tests for a task complete signal by monitoring the status funnel (SF) registers illustrated in FIG. 4.

The status funnel (SF FIG. 4) makes use of the latch 104 for each picket. Each picket has a latch 104 which can be loaded to reflect the status condition of the picket. The SIMD controller can test the collective value in these latches (one per picket) by monitoring an array status line. This array status line is the logical combination of the values from each of the picket status latches.

In the following example, assume that one would want to adjust a value that is bigger than 250 to be in the range 500<x<=250. The following routine would use the status funnel to detect that the task was accomplished.

```
If VALUE < 500 then TURN YOUR PICKET OFF
STAT < - PICKET OFF CONDITION
IF STAT FUNNEL = OFF then finished - - - -
VALUE < - VALUE - 250
Repeat
```

So, the multiple parallel picket processors configuration can be configured in various manners, and as a SIMD processor. Such a SIMD machine in the preferred embodiment is programmed to execute a single thread of instructions in the classical manner, and coded to execute on the array of SIMD processors in sequential fashion similar to classical processors, under general control of a SIMD controller or sequencer. At the application level this is accomplished by vector and vector like instructions, and vectors can be processed within processors and across processors. Vector instructions can be added with macroinstructions, typically with 6 to 10 such instructions.

With such a preferred embodiment, the system will appear schematically as illustrated in the functional block diagram of the parallel processor subsystem illustrated in FIG. 6. Through the I/O ports of the system as controlled by the host interface control 413, the subsystem sequencer functions similarly to a SIMD program with high function macros controlling the functions of the processing elements. Memory addressing enables an 8 bit, byte-wide, data flow, and modulo 8 arithmetic logic is used for functions (logical, add, multiply and divide). Provision is made for floating-point format and for autonomous picket operation with individual sleep and doze mode and separate addressing.

The subsystem controller's arrangement is illustrated in FIG. 7. Each of the processor array cards 512 (shown as 4 in this subsystem illustration, but capable of being reduced to 2 SEM E cards) are coupled to a sequencer CRP 703, which is coupled to a subsystem controller 702 which in turn is ported to either the main memory system or to another subsystem in the configuration via a chip 705 interface to the associated microchannel bus 706. In the preferred embodiment, the subsystem controller is a general purpose microprocessor unit of the IBM's PS/2 (a trademark of IBM) and employs an Intel 386 processing chip and 4 Mbytes memory. The personal computer microprocessor MP 702 is coupled to the sequencer's card via a microchannel type bus 705, 706 within the subsystem.

GENERAL DISCUSSION OF PREFERRED FLOATING-POINT EMBODIMENT

A floating-point format for the above system will allow array SIMD machines to execute floating-point arithmetic operations. For convenience of illustration we have described the floating-point format in FIG. 8, which shows the floating-point format described herein. The fraction count shifts one byte for an exponent count of 1.

A key to the successful implementation for floating-point in a SIMD machine is the right format, as illustrated in FIG. 8. The correct format implies that the format is compatible with some aspect of the architecture and not necessarily with one of the existing floating-point standards.

We provide a format that executes on a byte-wide dataflow with several times the performance of a conventional implementation.

The format generates an answer that is at least as accurate as the IEEE 32-bit floating-point standard. It is about 2 bits more accurate on the average.

The format can easily be converted to/from an existing standard for the user's consumption.

Therefore, the "outside" world can see a recognizable standard. We can efficiently execute the floating-point in this suggested format internal to the pickets, and translate the data between formats as needed when data is loaded or removed from the parallel processor.

The floating-point format was chosen to gain implementation efficiency on the multi-byte-wide data flow. The format yields implementation efficiencies while providing computational accuracy in excess of the IEEE 32-bit floating-point format.

The format illustrated in FIG. 8 is representative of a format suitable for the accuracy greater than the IEEE 32-bit floating-point format and is intended to be implemented in machines having byte-wide (8 bit) data streams. The preferred format consists of a sign bit, 7 exponent bits and 4 fraction bytes of eight bits for a total of 40 bits.

As to accuracy, the process of adjusting a floating-point number to obtain the largest number of significant figures in the fraction is commonly known as normalization. A binary based floating-point adjusts the fraction such that there are no leading zeros. If the format has a 24 bit fraction (as is common), then all 24 bits contribute to accuracy. Our format is based on adjusting 1 byte at a time. Thus, a fully normalized number may have as many as 7 leading zeros in the fraction. With a 24 bit fraction, a byte adjusted format will have 17 bit accuracy in the worst case. We added a byte to the 32-bit fraction to achieve 32−7=25 bit worst case accuracy. However, there is now a range of leading zeros (0–7) so on the average fraction significance is around 27–28 bits as compared to 24 with binary based floating-point adjust.

Okay, In floating-point instructions, there are two operations that require left or right shifting of the fraction and an accompanying decrement or increment of the exponent. The operations are called ADJUST and NORMALIZE. ADJUST is the alignment of one number to agree with another's exponent prior to an add or subtract. NORMALIZE involves a left shift of the floating-point fraction to remove excess leading zeros and accompanying decrementation of the exponent. Our system can be used to perform these operations on a multi-byte-wide processor implementation, the preferred embodiment being a byte-wide implementation.

It is noted that the basic math operations (+, −, ×, /) also run as constant time operations in parallel, using well known techniques (eg. 2 bit-at-a-time multiply step). Here, the 8-bit dataflow is a real advantage over other 1-bit flows of bit-serial machines. And, the same computational style can be extended to obtain floating-point computation with more accuracy by extending the fraction an integral number of bytes in length.

With our approach and floating-point format, each count of the exponent represents an 8 bit shift of the fraction, so a normalized number can have up to 7 leading zeros. If there are 8 or more leading zeros, then the number needs an adjustment to normalize it.

FIG. 9 illustrates the steps to do floating-point adjust by a byte shift of the fraction and the increment of 1 of the floating-point exponent. The particular arrangement permits the use of memory to do adjust shifts.

FIG. 9 illustrates using adjust shift to do the floating-point adjust. In the system, the data word is made up with the format of FIG. 8. The floating-point adjustment consists of shifting the fraction 8 bits to the left and reducing the exponent by 1. In a byte-wide data flow typified by the above described system, this shifting can be accomplished by simply taking the next byte as the first and by dropping the first byte of all zeros. Implementation of this shift can be accomplished in a couple of ways. In a byte-wide dataflow, shift the data in one byte-wide shift in one clock cycle. Up to three shifts are required. This can be combined with the leading zeros testing.

Figure 10:
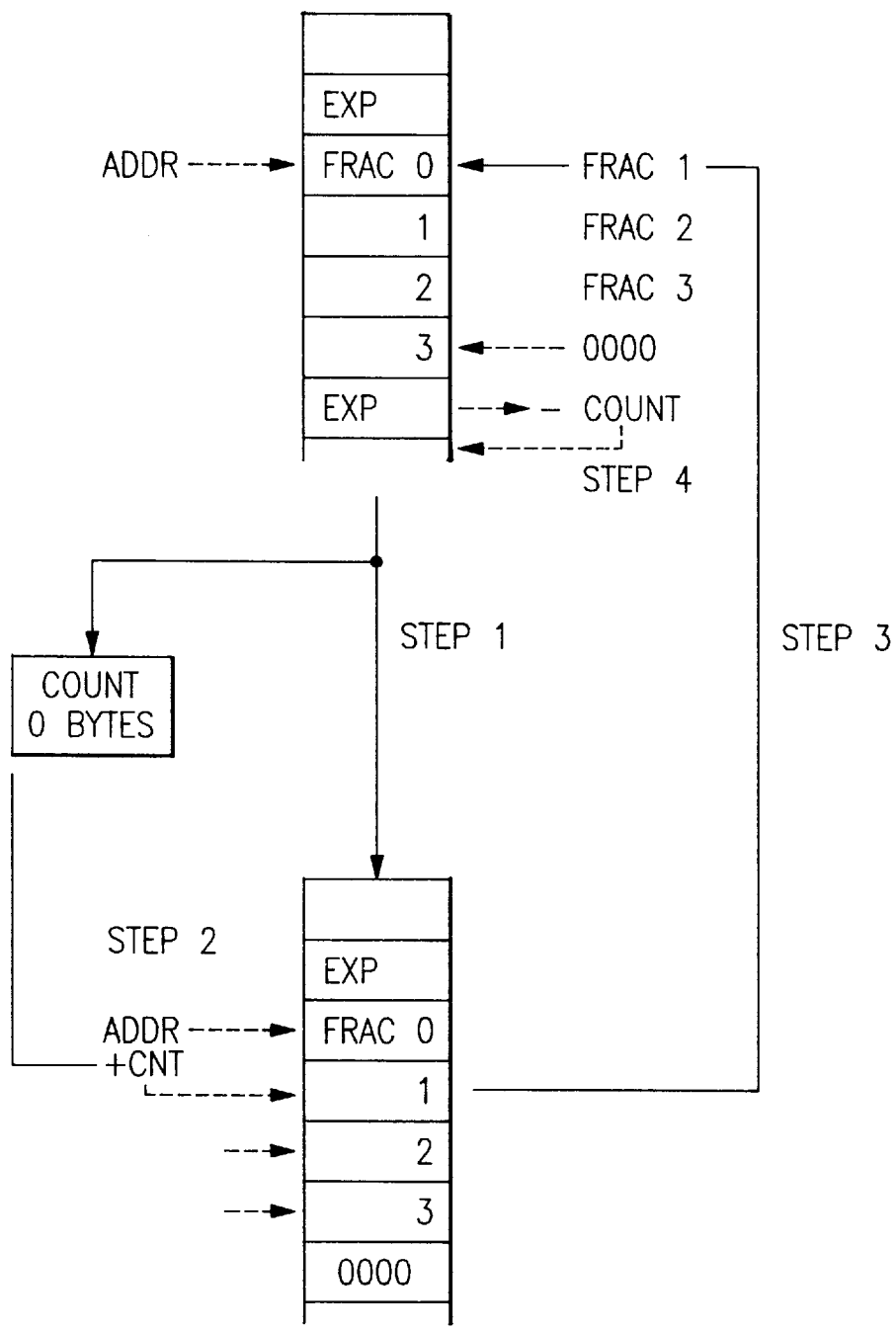
FIG. 10 shows how to use memory to do adjust shifts in accordance with our invention.

FIG. 10 illustrates the use of adjust shifts by using the byte-wide memory to advantage to perform the shifts that are part of the floating-point adjust operation.

Another approach illustrated in FIG. 10 can be implemented for parallel arrays and is especially advantageous in those machines where the processing element of the array has its own memory. We here assume the data resides in memory. The machine will first determine the number of bytes of leading zeros. Then, the machine will use the count of leading zero bytes to adjust the fetch address used to get the data. The normalize process can then be accomplished in four clocks as part of a data move operation.

It is desirable, in a SIMD machine, to make all operations execute in a fixed pre-determined number of cycles. With conventional floating-point, where one count in the exponent represents one fraction bit, the shift and count process takes place once for each leading zero in the fraction. There would be from 0 to 32 cycles to perform normalize. Each picket would be executing the correct number of cycles for the fraction in its hardware, and that number is different for other pickets. To make this process deterministic, the entire SIMD machine must execute the maximum number of cycles (32), with a lot of idle time in many pickets.

The idea described here has been made deterministic and is executed in 12 cycles as we will now illustrate.

1. Move the fraction from memory to a register (in memory) a byte at a time starting with the most significant end, and note if each byte contains all zeros. If so, count the number of bytes that do. (This operation takes 4 cycles.)

2. Assume a pointer which contains the 'address' of the most significant byte of the fraction. Add the count of zero bytes (0-4) to this pointer so that it points to the most significant non-zero byte of the fraction. (This operation takes 1 cycle.)

3. Store the fraction back into memory using the pointer to start with the most significant non-zero byte, and padding the least significant end with bytes containing zeros. (This operation takes 4 cycles.)

4. Now decrement the exponent by the count and store it back into memory (This operation takes 3 cycles.)

This operation is shown both pictorially and as implemented in a picket in the drawings.

To accomplish the above approach to normalize, several features of the picket design require a degree of local autonomy. Some of these are described in the the application entitled "Picket Autonomy on a SIMD Machine" referenced above. The features providing limited PE or picket autonomy include:

test for zero and put in status;

increment counter if status is set; and provide data-dependent access to memory using pointer value in register as the memory index.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A floating-point computer system for processing a range of possible floating-point numbers, comprising:

data processing means for processing a data stream;

memory means coupled to said data processing means by a data path accommodating block wide data flow, a block including a predetermined integer number of bits greater than one, said memory means having a plurality of separately addressable locations each for storing a block of data; and a floating-point data format having a sign part having one bit, an exponent part having a plurality of bits and a fraction part having a length of a plurality of said blocks for data, and wherein said exponent is changed by one count for each shift of said fraction by one of said blocks, and wherein a normalization or an adjustment operation of a floating point number stored in said memory means is performed according to said data processing means successively testing each one of said plurality of blocks of said floating point number for zero value according to an operation which operates on each bit of a given one of said plurality of blocks in parallel, and modifying a pointer to said floating point number in memory based on the number of leading zero blocks for said floating point number, said normalization or adjustment operation thereby being executed in a deterministically fixed number of cycles which does not vary for a range of possible floating-point numbers having different numbers of leading zero blocks.

2. A floating-point computer system for processing a range of possible floating-point numbers according to claim 1 wherein each block of said fraction includes one byte, said fraction having four of said blocks, and wherein the format uses a total of 40 bits, said floating-point data format being executable in machines having a byte-wide data stream.

3. A floating-point computer system for processing a range of possible floating-point numbers according to claim 1 wherein said data processing means includes a byte-wide SIMD array processor.

4. A floating-point computer system for processing a range of possible floating-point numbers according to claim 1 wherein said data processing means includes an array of processing units each having a processing element and memory.

5. A floating-point computer system for processing a range of possible floating-point numbers according to claim 1 wherein said block is byte-wide and a fraction part of the floating-point data is processed in byte-wide increments, thereby an exponent part of the floating-point data is incremented/decremented one count for each byte shift of the fraction during floating-point processing.

6. A floating-point computer system for processing a range of possible floating-point numbers according to claim 1 wherein in processing of floating-point data by said data processing means, a test for establishing the number of leading zeros in a floating-point number is performed a byte at a time.

7. A floating-point computer system for processing a range of possible floating-point numbers according to claim 1 wherein in processing of data by said data processing means a test for establishing the number of leading zeros in a floating-point number is performed a byte at a time, and during processing by said data processing means the byte-wide leading zeros test can be performed as a part of a data move operation prior to a floating-point operation.

8. A floating-point computer system for processing a range of possible floating-point numbers according to claim 1 wherein the floating-point data is processed in multiple byte-wide increments and an exponent part of the floating-point data is incremented/decremented one count for each byte shift of the fraction during floating-point processing.

9. A floating-point computer system for processing a range of possible floating-point numbers according to claim 1 wherein said data processing means includes a plurality of picket units, each picket unit having a bit parallel processing element combined with a local memory coupled to the processing element for the parallel processing of information in all picket units in such a way that each picket unit is adapted to perform one element of a process which utilizes memory.

10. A floating-point computer system for processing a range of possible floating-point numbers according to claim 9 wherein the memory of the plurality of picket units are arranged in an array and the array of pickets with their memory comprises a set associative memory.

11. A floating-point computer system for processing a range of possible floating-point numbers according to claim 9 wherein said computer system is configurable as a SIMD and MIMD system, and groups of said plurality of picket units are assigned to a programmable configuration, in which individual units of the system have a degree of local autonomy.

12. A floating-point computer system for processing a range of possible floating-point numbers according to claim 9 wherein a plurality of picket units each have local autonomy and in response to a normalization or an adjustment operation on a floating point number, test each block of said floating point number sequentially read out from memory for zero value and set a status bit in the event that a block has a zero value; and increment a counter if status is set; and provide data-dependent access to memory using a pointer value in a register of said data processing system as a memory index.

13. A floating-point computer system for processing a range of possible floating-point numbers according to claim 1 wherein during floating-point processing a fraction count shifts one byte for an exponent count of 1.

14. A floating-point computer system for processing a range of possible floating-point numbers according to claim 1 wherein during processing by said data processing means a floating-point adjust is performed by a byte shift of the fraction and the increment of 1 of the floating-point exponent.

15. A floating-point computer system for processing a range of possible floating-point numbers according to claim 1 wherein the floating-point processing implementation of said data processing means permits memory to be used for doing floating-point adjust shifts.

16. A floating-point computer system for processing a range of possible floating-point numbers according to claim 1 wherein each count of the exponent represents an 8 bit shift of the fraction, during processing, so a normalized number can have up to 7 leading zeros, and if there are 8 or more leading zeros, then the number needs an adjustment to normalize it, and wherein during data processing the floating-point adjustment consists of shifting the fraction 8 bits to the left, and reducing the exponent by 1.

17. A floating-point computer system for processing a range of possible floating-point numbers according to claim 16 wherein said shifting the fraction 8 bits to the left can be accomplished by taking the next byte as the first and by dropping the first byte of all zeros.

18. A floating-point computer system for processing a range of possible floating-point numbers according to claim 16 wherein shifting can be accomplished in a byte-wide dataflow process by shifting data in a one byte-wide shift in one clock cycle, for a plurality of shifts.

19. A floating-point computer system for processing a range of possible floating-point numbers according to claim 18 wherein a machine process first performs leading zeros testing and adjusts its execution process using the test for leading zeros.

20. A floating-point computer system for processing a range of possible floating-point numbers according to claim 16 wherein shifting is accomplished in a byte-wide dataflow process by adjusting where data resides in memory, and the machine process first determines the number of bytes of leading zeros, and then the machine process uses the count of leading zero bytes to adjust the fetch address used to get the data, and a normalize process is then accomplished as part of a data move operation in four cycles.

21. A method for processing a range of possible floating-point numbers with a computer system using a floating point format for data, said floating point format including a sign bit, an exponent part, and a fraction part having a plurality of multi-bit blocks, said method comprising the steps of:

moving the fraction from memory to a storage location in a block-wise manner, starting with the most significant block, and determining whether each block contains all zeros, and generating a count signal value representing the number of sequential blocks including the most significant block, that contain all zeros;

adding the count signal value to a pointer which identifies the address of the most significant block of the fraction so that the pointer points to the most significant non-zero block of the fraction; and storing the fraction back into memory using the pointer to start with the most significant non-zero block, and padding the least significant count number of blocks with blocks containing zeros; and decrementing the exponent by the count;

said processing thereby being executed in a deterministically fixed number of cycles which does not vary for a range of possible floating-point numbers having different numbers of leading zero blocks.

22. A parallel array processor providing single instruction multiple data (SIMD) operation, and including a plurality of interconnected nodes, each node comprising:

a processing element for processing an independent data stream;

a memory coupled to said processing element by a data path accommodating block wide data flow, a block including a predetermined integer number of bits greater than one, said memory means having a plurality of separately addressable locations each for storing a block of data;

a floating-point data format having a sign part having one bit, an exponent part having a plurality of bits and a fraction part having a length of a plurality of said blocks for data, and wherein said exponent is changed by one count for each shift of said fraction by one of said blocks, thereby providing that normalization results in the fraction part having a non-zero bit in the most significant block;

wherein normalization of a given floating point number having an arbitrary number of leading zeroes is performed in block wide operations and requires a number of clock cycles which is independent of the arbitrary number of leading zeroes, and is performed according to said processing element successively testing each one of said plurality of blocks of said floating point number for zero value according to an operation which operates on each bit of a given block in parallel, and modifying a pointer to said floating point number in memory based on the number of leading zero blocks for said floating point number; and wherein normalization or adjustment of floating point numbers respectively stored in each said memory of each node is provided by each node executing the steps of;

moving the fraction from the memory to a storage location in a sequential block-wise manner, starting with a most significant block, and determining whether each block contains all zeros, and generating a count signal value representing the number of sequential blocks, including the most significant block, that contain all zeros;

adding the count signal value to a pointer which identifies the address of the most significant block of the fraction so that the pointer points to the most significant non-zero block of the fraction; and storing the fraction back into memory using the pointer to start with the most significant non-zero block, and padding the least significant count number of blocks with blocks containing zeros; and decrementing the exponent by the count, thereby providing for SIMD floating point normalization or adjustment among the nodes in a predetermined number of clock cycles, independent of value differences among the floating point numbers respectively stored in each said memory of each node.

* * * * *

UNITED STATES PATENT AND TRADEMARK OFFICE
CERTIFICATE OF CORRECTION

PATENT NO. : 5,809,292
DATED : 09/15/98
INVENTOR(S) : Wilkinson et al.

It is certified that error appears in the above-identified patent and that said Letters Patent is hereby corrected as shown below:

Abstract, line 29, "1/0" should be --I/O--

Signed and Sealed this

Twenty-sixth Day of October, 1999

Attest:

Q. TODD DICKINSON

Attesting Officer

Acting Commissioner of Patents and Trademarks